(12) United States Patent
Yamaguchi

(10) Patent No.: US 7,724,415 B2
(45) Date of Patent: May 25, 2010

(54) DISPLAY DRIVE DEVICE AND DISPLAY DEVICE

(75) Inventor: Tomoharu Yamaguchi, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 383 days.

(21) Appl. No.: 11/729,418

(22) Filed: Mar. 28, 2007

(65) Prior Publication Data

US 2007/0229933 A1    Oct. 4, 2007

(30) Foreign Application Priority Data

| | | |
|---|---|---|
| Mar. 29, 2006 | (JP) | 2006-089724 |
| Mar. 29, 2006 | (JP) | 2006-089725 |
| Mar. 29, 2006 | (JP) | 2006-089726 |
| Jun. 23, 2006 | (JP) | 2006-173948 |
| Jun. 23, 2006 | (JP) | 2006-173949 |
| Jun. 23, 2006 | (JP) | 2006-173950 |

(51) Int. Cl.
   *G02F 1/03* (2006.01)

(52) U.S. Cl. .............. 359/242; 359/254; 359/265; 359/267

(58) Field of Classification Search ............. 359/242
See application file for complete search history.

(56) References Cited

U.S. PATENT DOCUMENTS

| | | | | |
|---|---|---|---|---|
| 4,194,812 A | * | 3/1980 | Hara et al. | 359/274 |
| 4,298,870 A | * | 11/1981 | Saegusa | 345/105 |
| 5,379,146 A | * | 1/1995 | Defendini | 359/275 |
| 5,581,406 A | * | 12/1996 | Kobayashi et al. | 359/604 |

* cited by examiner

*Primary Examiner*—Jessica T Stultz
(74) *Attorney, Agent, or Firm*—Frishauf, Holtz, Goodman & Chick, P.C.

(57) ABSTRACT

A display drive device comprises a display element being colored by injecting an electric charge into an electrolyte via an display electrode due to an oxidation-deoxidization reaction and being decolored by injecting an electric charge having an inverse polarity of the electric charge into the electrolyte, at least one constant current supply circuit which supplies a constant current as a decoloration current pulse having a predetermined pulse width to the display electrode upon the decoloration, a voltage detection circuit which detects a voltage value generated in the display electrode, and a control circuit which controls an operation of the constant current supply circuit intermittently and repeatedly supplying the decoloration current pulse from the constant current supply circuit to the display electrode upon the decoloration, and ending the decoloration on the basis of a voltage value to be detected by the voltage detection circuit.

35 Claims, 15 Drawing Sheets

DISPLAY DRIVE DEVICE AND DISPLAY DEVICE

CROSS-REFERENCE TO RELATED APPLICATIONS

This application is based upon and claims the benefit of priority from prior Japanese Patent Applications No. 2006-089724, filed Mar. 29, 2006; No. 2006-089725, filed Mar. 29, 2006; No. 2006-089726, filed Mar. 29, 2006; No. 2006-173948, filed Jun. 23, 2006; No. 2006-173949, filed Jun. 23, 2006; and No. 2006-173950, filed Jun. 23, 2006, the entire contents of all of which are incorporated herein by reference.

BACKGROUND OF THE INVENTION

1. Field of the Invention

The present invention relates to a display drive device for driving a display unit having an electrochromic element and a display device provided with the same.

2. Description of the Related Art

There have been proposed various display devices having a display unit provided with a display element (namely, an electrochromic element) using a phenomenon such that a solute in an electrolyte separates out or dissolve due to an oxidation-deoxidization reaction by injecting an electric charge in the electrolyte. For example, in the case of the display device using bismuth (Bi) as a main material, when a negative electric charge is injected from a transparent electrode such as an indium tin oxide (ITO), a Bi ion in the electrolyte is deoxidized to separate out on the transparent electrode and this part is colored black. On the contrary, when a positive charge is injected from the transparent electrode into the electrolyte, Bi which has separated out on the transparent electrode is oxidized to solve into the electrolyte and this part is decolored.

In this type of display device, the amount of the solute to separate out is determined depending on the amount of the electric charge injected into the electrolyte, so that the larger the area of the display unit is, the more the amount of the solute should be increased by injecting more electric charges into the electrolyte.

In order to inject the electric charge according to the area of the display unit in this way, conventionally, the electric charge is injected by supplying a constant voltage for a predetermined time. In the case of driving the display unit by supplying the constant voltage from the display drive device for driving the display unit to the display unit, it has been known that a resistance value of the display unit at the time of coloration is in inverse proportion to the display area if a wiring resistance up to the display unit can be ignored. In addition, it has been known that the resistance value is in inverse proportion to the display area also at the time of decoloration until the decoloration is completed, as well as at the time of coloration. As a result, when the constant voltage is supplied from the display drive device for a predetermined time, it is possible to inject the electric charge of the amount which is approximately in proportion to the display area.

However, a method for simply supplying a predetermined amount of voltage waveform involves a problem that it is difficult to keep a balance between the amount of the solute to separate out and the amount of the solute to be dissolved, and an operating life is short. In other words, if coloration and decoloration are repeated many times, the balance between the amount of the solute to separate out and the amount of the solute to be dissolved is deteriorated, and this easily causes a defect where a part of the colored portion does not decolor due to excessive deposition and the electrolyte may change colors due to generation of other substance (for example, an iodine) in the electrolyte because dissolution of the solute has been progressed too much. Particularly, if time from a coloration step to a decoloration step is made longer, the decoloration may naturally occur and this easily generates excessive decoloration.

In the case of decoloration, differently from coloration, when the decoloration has progressed to some degrees, it has been known that the resistance value is changed and a current is decreased. In order to compensate decrease of the amount of the electric charge due to decrease of the current, the voltage in the case of the decoloration should be higher than that in the case of coloration or the voltage supplying time should be longer, because the amount of the electric charge necessary for decoloration is equivalent to that necessary for coloration. In this case, a voltage drop is generated due to a wiring resistance between the display unit and the display drive device and a contact resistance between the circuits or the like and the flowing current is largely changed, so that it is necessary to control the supplied voltage and the supplying time in consideration of these effects. However, the value of the wire resistance and the value of the contact resistance between the circuits generally vary widely and it is not easy to make these values constant.

BRIEF SUMMARY OF THE INVENTION

The present invention has an advantage that a good display quality can be obtained for a long period of time by appropriately determining the end of the decoloration step and preventing generation of the excessive decoloration, in a display drive device for driving a display unit having an electrochromic element and a display device provided with the same.

In order to obtain the above advantage, there is provided a first display drive device comprising: a display element including at least one display electrode and one counter electrode disposed opposite to the display electrode, and an electrolyte between the display electrode and the counter electrode, the display element being colored by injecting an electric charge into the electrolyte via the display electrode due to an oxidation-deoxidization reaction and being decolored by injecting an electric charge having an inverse polarity of the electric charge into the electrolyte; at least one constant current supply circuit which supplies a constant current as a decoloration current pulse having a predetermined pulse width to the display electrode upon the decoloration and injects the electric charge having the inverse polarity into the electrolyte; a voltage detection circuit which detects a voltage value generated in the display electrode; and a control circuit which controls an operation of the constant current supply circuit intermittently and repeatedly supplying the decoloration current pulse from the constant current supply circuit to the display electrode upon the decoloration, and ending the decoloration on the basis of a voltage value to be detected by the voltage detection circuit.

In order to obtain the above advantage, there is provided a second display drive device comprising: a display element including at least one display electrode and one counter electrode disposed opposite to the display electrode, and an electrolyte between the display electrode and the counter electrode, and the display element being colored by injecting an electric charge into the electrolyte via the display electrode due to an oxidation-deoxidization reaction and being decolored by injecting an electric charge having an inverse polarity of the electric charge into the electrolyte; at least one constant current supply circuit which supplies a constant current as a decoloration current pulse having a predetermined pulse width to the display electrode upon the decoloration and injects the electric charge having the inverse polarity into the electrolyte; a voltage detection circuit which detects a voltage value generated in the display electrode; and a control circuit which controls an operation of the constant current supply circuit intermittently and repeatedly supplying the decoloration current pulse at predetermined supply intervals from the constant current supply circuit to the display electrode upon the decoloration, and ending the supply operation of the decoloration current pulse to the display electrode when the voltage value to be detected by the voltage detection circuit when the decoloration current pulse is not supplied from the constant current supply circuit to the display electrode exceeds a preset first reference value.

In order to obtain the above advantage, there is provided a third display drive device comprising: a display element including at least one display electrode and one counter electrode disposed opposite to the display electrode, and an electrolyte between the display electrode and the counter electrode, the display element being colored by injecting an electric charge into the electrolyte via the display electrode due to an oxidation-deoxidization reaction and being decolored by injecting an electric charge having an inverse polarity of the electric charge into the electrolyte; at least one constant current supply circuit which supplies a constant current as a decoloration current pulse having a predetermined pulse width to the display electrode upon the decoloration and injects the electric charge having the inverse polarity into the electrolyte; a voltage detection circuit which detects a voltage value generated in the display electrode; and a control circuit which controls an operation of the constant current supply circuit repeating the supply operation of the decoloration current pulse from the constant current supply circuit to the display electrode when the voltage value to be detected by the voltage detection circuit reaches a preset second reference value after the decoloration current pulse is supplied from the constant current supply circuit to the display electrode and before a preset determination time has passed upon the decoloration, and ending the supply operation of the decoloration current pulse to the display electrode of the display unit by the constant current supply circuit when the voltage value to be detected by the voltage detection circuit does not reach the preset second reference value before the first determination time has passed.

In order to obtain the above advantage, there is provided a display device comprising: a display unit including at least one display electrode and one counter electrode disposed opposite to the display electrode, and an electrolyte between the display electrode and the counter electrode, and the display unit being colored by injecting an electric charge into the electrolyte via the display electrode due to an oxidation-deoxidization reaction and being decolored by injecting an electric charge having an inverse polarity of the electric charge into the electrolyte; at least one constant current supply circuit which supplies a constant current as a decoloration current pulse having a predetermined pulse width to the display electrode of the display unit upon the decoloration and injects the electric charge having the inverse polarity into the electrolyte; a voltage detection circuit which detects a voltage value generated in the display electrode of the display unit; and a control circuit which controls an operation of the constant current supply circuit intermittently and repeatedly supplying the decoloration current pulse from the constant current supply circuit to the display electrode of the display unit upon the decoloration, and ending the decoloration on the basis of a voltage value of the display electrode to be detected by the voltage detection circuit.

DETAILED DESCRIPTION OF THE INVENTION

Figure 1:
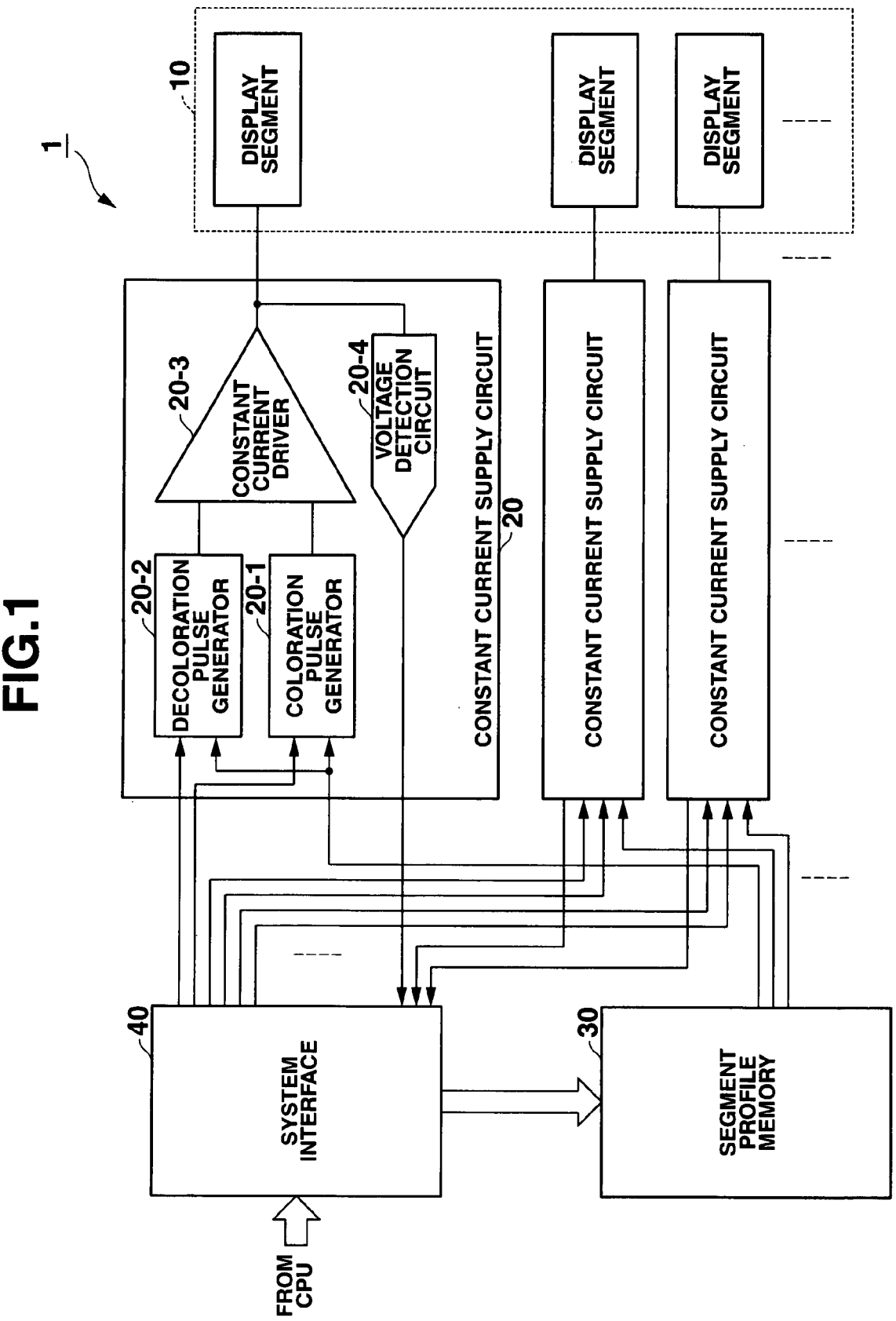
FIG. 1 is a block diagram showing a configuration of a display device, to which a display drive device according to a first embodiment is supplied.

The details of a display drive device and a display device provided with the same according to the present invention will be described below with reference to embodiments shown in the drawings.

Various limitations which are technically preferable in order to put the present invention in practice are given to respective embodiments to be described below. However, the scope of the invention is not limited to the following embodiments and the illustrated examples.

First Embodiment

At first, a first embodiment according to the present invention will be described.

FIG. 1 is a block diagram showing a configuration of a display device, to which a display drive device according to the first embodiment of the present invention is supplied.

Figure 2:
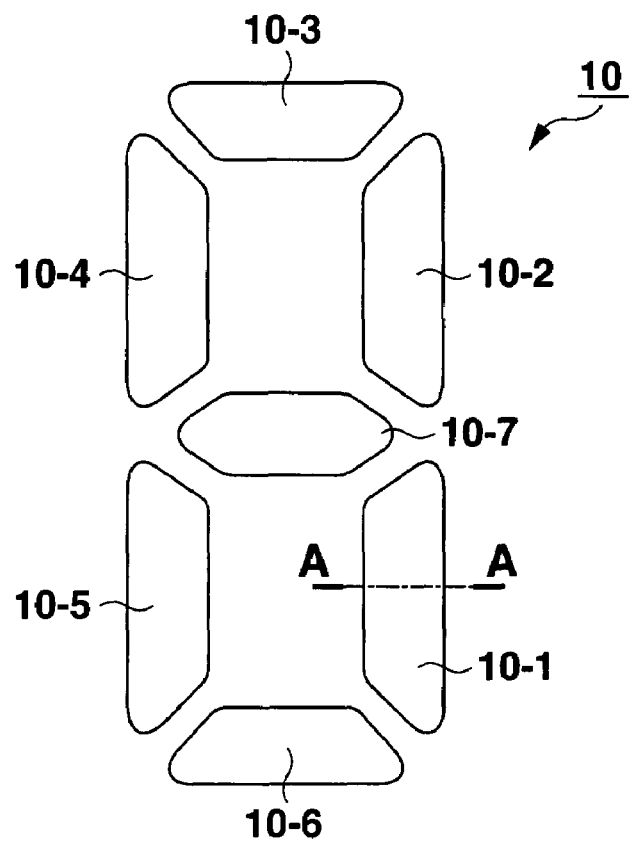
FIG. 2 is a view showing an alignment example of a display segment of a display panel.

FIG. 2 is a view showing an alignment example of a display segment of a display panel.

The display device shown in FIG. 1 is formed by a display panel 10, a constant current supply circuit 20, a segment profile memory 30, and a system interface 40.

According to the display device of the present embodiment, as shown in FIG. 1, the display panel 10 has a plurality of display segments (display element) including display electrode and the display device is driven by supplying a constant current from the constant current supply circuit 20 to respective display segments. Particularly, the display device is constituted such that a value of a current to be supplied to each display segment is set to a current value in proportion to the area of each display segment on the basis of the value stored in the segment profile memory 30.

The display panel 10 serving as display means is a display panel of a segment system having an display element including electrochromic element, and a plurality of display segments as the display unit are aligned, for example, as shown in FIG. 2. Here, the example of FIG. 2 is an alignment example of the display segment when using the display panel 10 as the display panel for displaying a display pattern such as alphabet and a numeral, and seven display segments (display segments 10-1 to 10-7) are aligned in a shape of 8. Further, the shape, the number, and the alignment of the display segment are not limited to those shown in FIG. 2 and they can be appropriately changed in accordance with the specification or the like to be required as the display panel.

Figure 3:
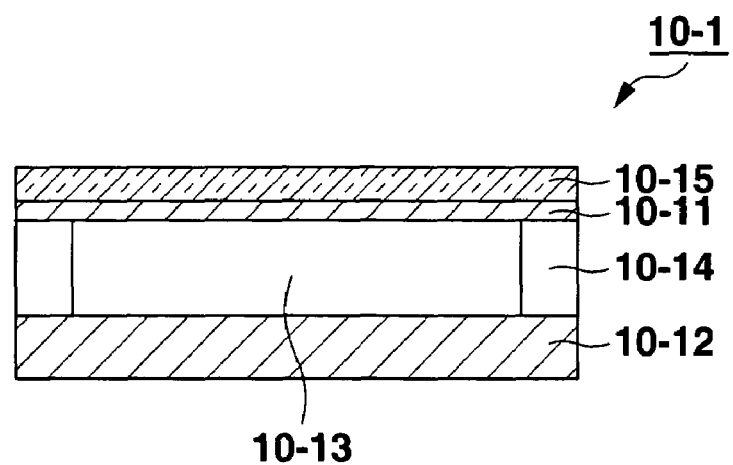
FIG. 3 is a cross sectional view for illustrating a configuration of the display segment shown in FIG. 2.

FIG. 3 is a cross sectional view taken on a line A-A for illustrating the configuration of the display segment shown in FIG. 2.

Here, the cross sectional view of FIG. 3 is a cross sectional view of the display segment 10-1 and the configuration of other display segments is basically equal to that to be illustrated in FIG. 3.

As shown in FIG. 3, the display segment is an electrochromic element where two pieces of electrodes (an electrode 10-11 as an display electrode and an electrode 10-12 as an counter electrode) are aligned in parallel, an electrolyte 10-13 is filled between these electrodes 10-11 and 10-12, and these components are sealed by a sealant 10-14. On the rear surface of the electrode 10-11, a glass substrate 10-15 for protecting the display segment is pasted. Here, the electrode 10-11 is a transparent electrode having a transparency, and for example, an indium tin oxide (ITO) is used. In addition, the electrode 10-12 may be a transparent electrode or an opaque electrode. As this electrode 10-12, for example, a copper (Cu) electrode is used.

Further, the electrolyte 10-13 is, for example, an electrolyte having Bi and Cu dissolved therein. Further, the materials indicated here are merely examples and may be appropriately changed. For example, a solute to be dissolved in the electrolyte is not limited to Bi but it may be silver (Ag) or the like. Further, not only a metal but also an organic matter such as a viologen compound may be used. In addition, as a solution for dissolving Bi and Cu, various solutions having a hydrobromic acid, a hydrochloric acid, an iodic acid or the like may be used. Further, as the electrolyte 10-13 between the electrode 10-11 and the electrode 10-12, a wet cake sheet holding the electrolyte may be used.

When a negative electric charge is injected in the electrolyte of the display segment constituted as shown in FIG. 3 via the electrode 10-11, a Bi ion in the electrolyte is deoxidized to separate out on the electrode 10-11. Thereby, the display segment emits black color. On the contrary, when a positive electric charge is injected to the electrolyte of the display segment, Bi separated out on the electrode 10-11 is oxidized to be dissolved into the electrolyte. Thereby, the black color of the display segment is decolored.

The constant current supply circuits 20 are provided as many as the display segments in response to each of a plurality of display segments constituting the display panel 10, and by supplying the constant current to each display segment, an electric charge for coloring or decoloring the display segment is injected.

Here, as shown in FIG. 1, the constant current supply circuits 20 is formed by a coloration pulse generator 20-1, a decoloration current pulse generator 20-2, a constant current driver 20-3, and a voltage detection circuit 20-4. These circuits and the operation thereof of the constant current supply circuits 20 will be described in detail later.

A segment profile memory 30 is a memory for storing the value of an area of each display segment or current value designation data necessary for an appropriate coloration corresponding to the area of each display segment corresponding to each display segment. In the following description, it is assumed that the current value designation data corresponding to the area of each display segment is stored in the segment profile memory 30. However, the value of the area of each display segment may be stored, and for example, the coloration pulse generator 20-1 and the decoloration current pulse generator 20-2 may be provided with a function to convert the data into the corresponding current value designation data. Then, by receiving an address signal from the system interface 40, the segment profile memory 30 may output the current value designation data stored in this address to the coloration pulse generator 20-1 and the decoloration current pulse generator 20-2 within the constant current supply circuit 20 which is connected to the corresponding display segment. Further, it is preferable that the segment profile memory 30 is a nonvolatile memory such as an EPROM and a flash ROM. By forming the segment profile memory 30 by the nonvolatile memory, even when the power source of the circuit is turned off, it is possible to hold the stored contents.

By receiving the instruction to display or not to display the display panel 10 from a CPU as a control circuit (not illustrated), the system interface 40 executes coloration or decoloration to the display segments corresponding to this instruction. Therefore, the system interface 40 may output pulse width designation data to the coloration pulse generator 20-1 and the decoloration current pulse generator 20-2 within the relevant constant current supply circuit 20 and may output an address signal, corresponding to the address in which the current value designation data corresponding to the display segment to be colored or decolored is stored, to the segment profile memory 30.

Next, the constant current supply circuit 20 will be described further in detail.

Figure 4:
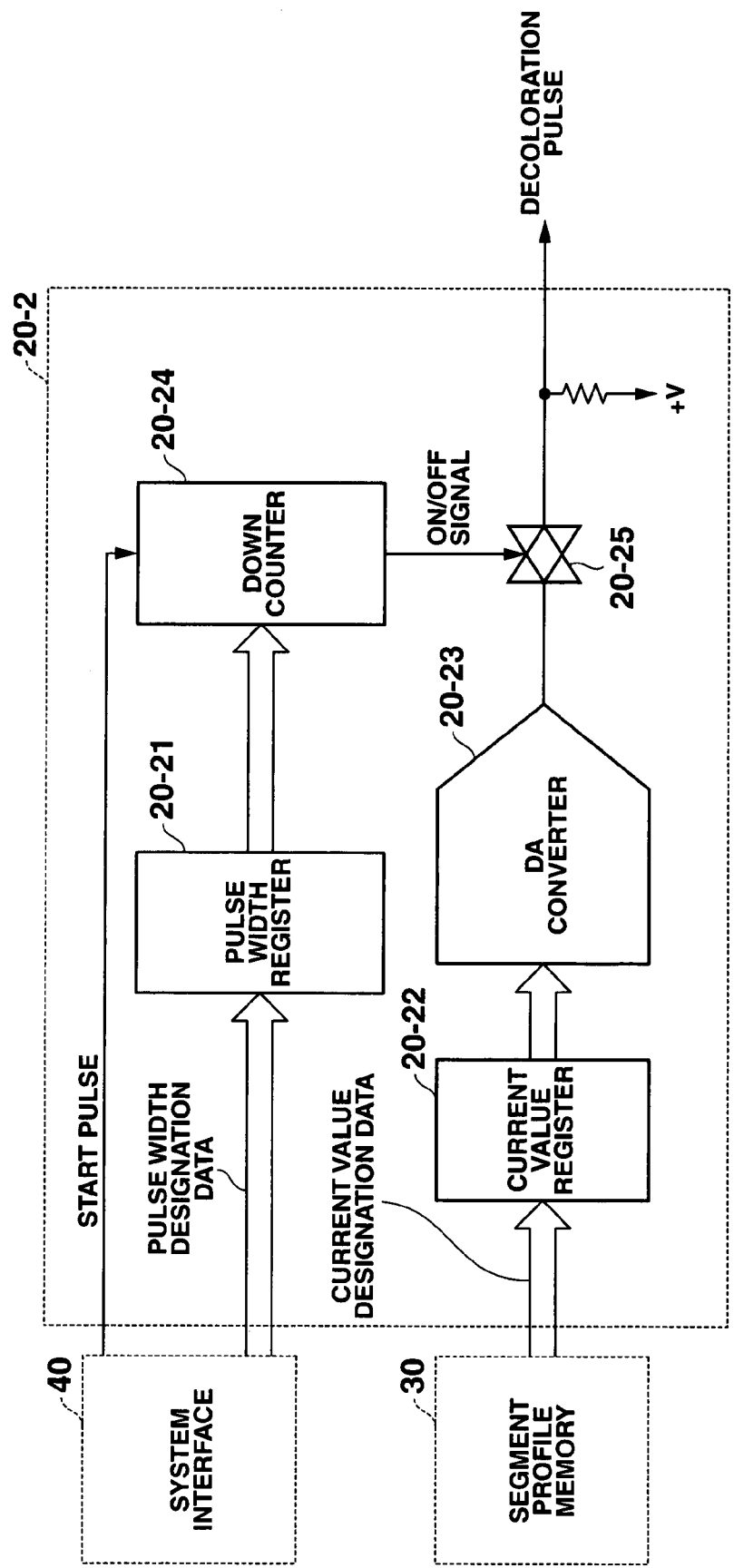
FIG. 4 is an example of a circuit block diagram when a decoloration current pulse generator is constituted by a sequential logic circuit.

FIG. 4 is an example of a circuit block diagram when the decoloration current pulse generator is constituted by a sequential logic circuit.

As shown in FIG. 4, the decoloration current pulse generator 20-2 is formed by a pulse width register 20-21, a current value register 20-22, a DA converter 20-23, a down counter 20-24 and an analog switch 20-25.

By receiving the pulse width designation data for designating the pulse width of the decoloration current pulse from the system interface 40, the pulse width register 20-21 holds this data.

By receiving the current value designation data corresponding to each display segment from the segment profile memory 30, the current value register 20-22 holds this data. The DA converter 20-23 converts the current value designation data held in the current value register 20-22 into an analog voltage signal.

The down counter 20-24 reads the value held in the pulse width register upon reception of a START pulse from the system interface 40 at the time of decoloration, and outputs an ON signal or an OFF signal to the analog switch 20-25 while counting down this value for each predetermined time. In other words, when the counted value is not 0, the down counter 20-24 outputs the ON signal, and when the counted value becomes 0, the down counter 20-24 outputs the OFF signal. The analog switch 20-25 is connected to the DA converter 20-23 and a positive power source +V, and upon reception of the ON signal from the down counter 20-24, the analog switch 20-25 is turned ON to input the output of the DA converter 20-23 to the constant current driver 20-3. Then, upon receiving the OFF signal, the analog switch 20-25 inputs the voltage value +V to the constant current driver 20-3.

According to such a constitution, the analog switch 20-25 is turned ON only when the down counter 20-24 is counting. As a result, a decoloration current pulse having a voltage value obtained by the DA converter 20-23 and a pulse width designated by the pulse width designation data is inputted to the constant current driver 20-3. Then, when the down counter 20-24 terminates counting, the analog switch 20-25 is turned OFF and the voltage value +V is inputted to the constant current driver 20-3.

Further, FIG. 4 shows the configuration of the decoloration current pulse generator 20-2. However, the coloration pulse generator 20-1 also can be realized by the circuit configuration which is nearly equal to that of the decoloration current pulse generator 20-2. In this case, in the coloration pulse generator 20-1, as a power source to be connected to the analog switch, not a positive power source but a negative power source –V is used. The coloration pulse generator 20-1 also can color the display segment not only in a perfect coloration state and a perfect decoloration state but also in a middle state thereof by allowing the pulse width thereof to be variable. Thereby, a gray scale display becomes possible.

Further, the functions of the coloration pulse generator 20-1 and the decoloration current pulse generator 20-2 may be realized by the calculation processing of a microcomputer or the like.

Figure 5:
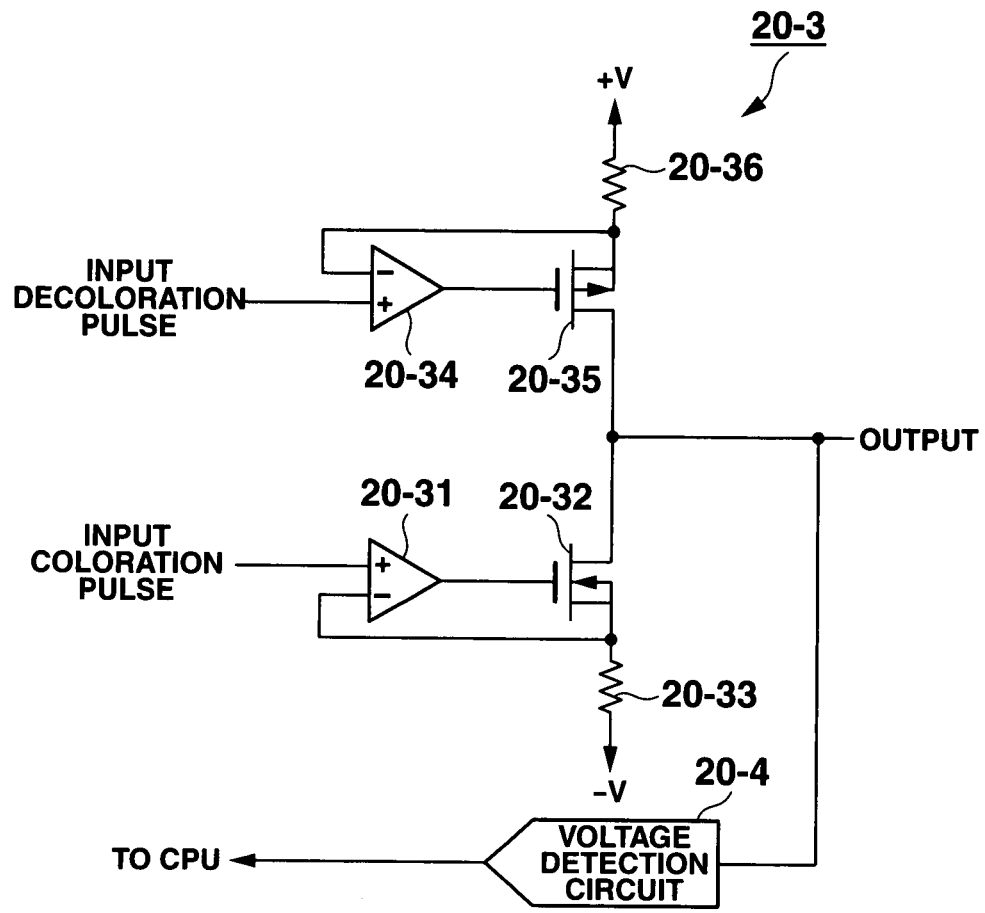
FIG. 5 is an example of a circuit constituting a constant current driver and a voltage detection circuit.

FIG. 5 is an example of a circuit constituting a constant current driver and a voltage detection circuit.

Figure 6:
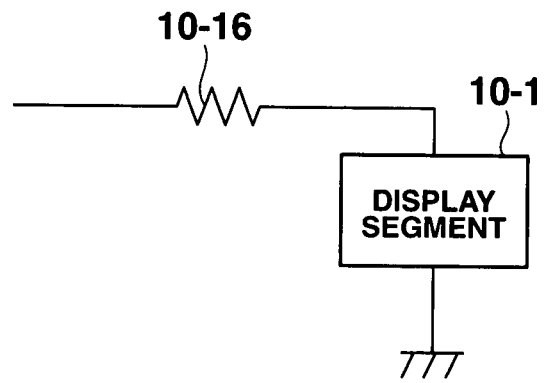
FIG. 6 is a view showing a wiring resistance between a constant current supply circuit and a display segment.

FIG. 6 is a view showing a wiring resistance between a constant current supply circuit and a display segment.

The constant current driver 20-3 is provided with a negative direction constant current supply circuit consisting of an operating amplifier 20-31, an MOS transistor 20-32, and a resistance 20-33, and a positive direction constant current supply circuit consisting of an operating amplifier 20-34, an MOS transistor 20-35, and a resistance 20-36. In addition, the voltage detection circuit 20-4 is formed by, for example, an AD converter.

In FIG. 5, the output from the coloration pulse generator 20-1 (a coloration pulse or –V) is inputted to a noninverting input terminal of the operating amplifier 20-31. Then, the output terminal of the operating amplifier 20-31 is connected to a gate of the MOS transistor 20-32, and a source of the MOS transistor 20-32 is connected to an inverting input terminal of the operating amplifier 20-31 and one end of the resistance 20-33. Further, the other end of the resistance 20-33 is connected to the negative power source –V. In addition, the output from the decoloration current pulse generator 20-2 (a decoloration current pulse or +V) is inputted to the noninverting input terminal of the operating amplifier 20-34. Further, the output terminal of the operating amplifier 20-34 is connected to a gate of the MOS transistor 20-35, and a source of the MOS transistor 20-35 is connected to the inverting input terminal of the operating amplifier 20-34 and one end of the resistance 20-36. Further, the other end of the resistance 20-36 is connected to a positive power source +V.

In addition, the drains of the MOS transistors 20-32 and 20-35 are connected to the output terminal of the constant current driver 20-3 in common. Then, the output terminal of the constant current driver 20-3 is connected to the display segment as shown in FIG. 6, for example, the display segment 10-1 and is also connected to the voltage detection circuit 20-4. The resistance represented by a reference numeral 10-16 of FIG. 6 is a resistance due to the wiring resistance, the contact resistance or the like between the constant current driver 20-3 and the display segment 10-1.

The operation of the constant current driver 20-3 will be described below. The basic operations of the negative direction constant current supply circuit and the positive direction constant current supply circuit are the same although the polarity of the voltage to be inputted and the direction of the current to be outputted are inverted between the two circuits. Therefore, the operation of only the positive direction constant current supply circuit will be described here.

In the configuration shown in FIG. 5, at the time of decoloration of the display segment, the decoloration current pulse is inputted from the decoloration current pulse generator 20-2 to the noninverting input terminal of the operating amplifier 20-31. Due to the input of this decoloration current pulse, the output of the operating amplifier 20-34 is supplied to the gate of the MOS transistor 20-35, so that the MOS transistor 20-35 is turned ON. Thereby, a current in response to the voltage value of the decoloration current pulse (the decoloration current pulse) flows from the output terminal of the constant current driver 20-3 toward the positive power source +V (namely, from the display segment 10-1 toward the constant current driver 20-3).

Here, the positive direction constant current supply circuit forms the constant current driver as shown in FIG. 5, so that the amount of the current to be supplied to the display segment 10-1 is kept constant despite change of the voltage in the display segment 10-1 or the like. Thus, a positive electric charge is injected in the display segment 10-1.

In addition, in the case where +V is inputted from the decoloration current pulse generator 20-2, the output of the operating amplifier 20-31 becomes 0, so that, in accordance with this, the MOS transistor 20-35 is turned OFF and the current output from the constant current driver 20-3 becomes 0.

Further, in the case where a coloration pulse is inputted to the negative direction constant current supply circuit from the coloration pulse generator 20-1, a current flows from the output terminal of the constant current driver 20-3 toward the negative power source −V (namely, from the constant current driver 20-3 toward the display segment 10-1).

In addition, the voltage detection circuit 20-4 formed by, for example, the AD converter detects a voltage in response to an electromotive force generated in the display segment when the decoloration current pulse is not supplied upon decoloration, namely, when the current is not outputted from the constant current driver 20-3, and inputs its voltage value in a CPU (not illustrated) via the system interface 40. In other words, it has been known that the display device has characteristics that the electric resistance of the display segment is increased and the electromotive force is generated in the display segment as decoloration progresses. By means of the voltage detection circuit 20-4, this electromotive force is detected as the voltage value.

Figure 7:
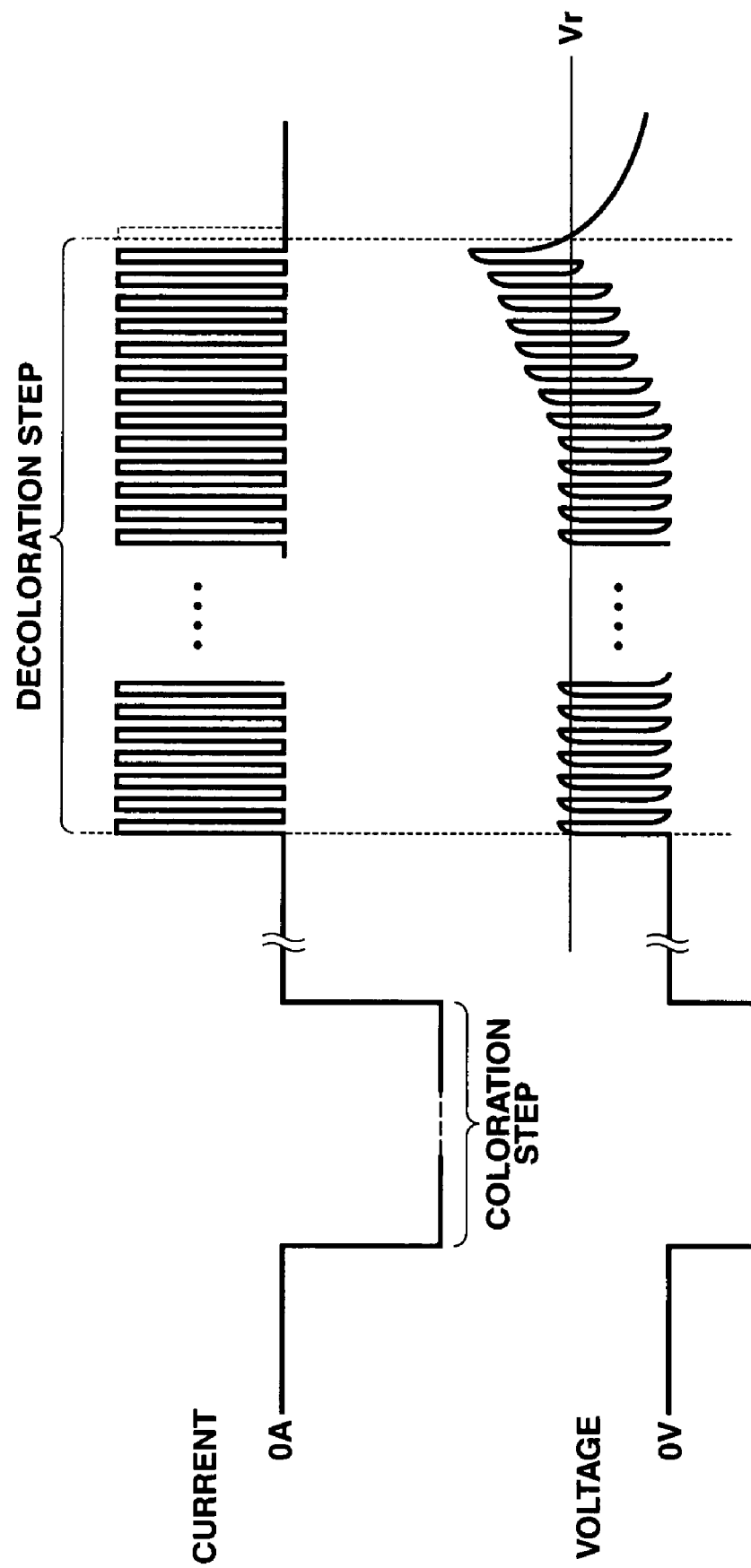
FIG. 7 is a timing chart showing a change of a current to be supplied from the constant current supply circuit to the display segment upon coloration and decoloration and a change of a voltage generated by this current according to the first embodiment.

FIG. 7 is a timing chart showing a change of a current to be supplied from the constant current supply circuit to the display segment upon coloration and decoloration and a change of a voltage generated by this current.

Further, in FIG. 7, the upper side of the drawing is determined to be a positive direction and the lower side thereof is determined to be a negative direction.

According to the present embodiment, a coloration current pulse is supplied to the display segment as one coloration current pulse made of, for example, a continuous constant current. This coloration current pulse is a negative constant current (a current from the display segment 10-1 toward the constant current driver 20-3) pulse which is designated by the pulse width designated by the pulse width designation data and the current value designation data. When such a coloration current pulse is supplied to the display segment, a negative electric charge equivalent to its supplied current×its supplying time is injected in the relevant display segment and coloration is caused. Here, the electric charge amount necessary for appropriately coloring the display segment is about 30 mC/cm² in the case of an electrolyte mainly made of Ag and Bi. However, according to the first embodiment, by allowing the supplying time of the constant current to be supplied to the display segment to be variable, it is possible to accurately control the amount of the electric charge to be injected in the display segment.

The decoloration current pulse is assumed to be a plurality of current pulses where supply of the constant current for a predetermined time is intermittently repeated. In this case, each current pulse is a pulse having a predetermined pulse width designated by the pulse width designation data and a predetermined positive constant current (the current from the constant current driver 20-3 toward the display segment 10-1) designated by the current value designation data. This decoloration current pulse is repeatedly supplied at predetermined supply intervals.

When such a decoloration current pulse is supplied to the display segment, a positive electric charge equivalent to its supplied current×its supplying time is injected in the relevant display segment and decoloration is caused. Further, according to the present embodiment, as an example, the supplying time of each decoloration current pulse is defined to be 10 ms. In addition, assuming that a next decoloration current pulse is supplied after a non-supply period of time (a supply interval) of 20 ms, and in response to its timing, a START pulse is to be given from a CPU (not illustrated) to the decoloration current pulse generator 20-2 of the constant current supply circuits 20 via the system interface 40.

In other words, the above-described pulse width designation data equivalent to the 10 ms is written from the CPU (not illustrated) in the pulse width register 20-21 of the decoloration current pulse generator 20-2 via the system interface 40 and then, the START pulse is supplied to the down counter 20-24 of the decoloration current pulse generator 20-2. Thereby, as described above, the analog switch 20-25 is turned ON only when the down counter 20-24 is counting the above-described pulse width designation data equivalent to the 10 ms. As a result, the decoloration current pulse having a voltage value obtained by the DA converter 20-23 is inputted in the constant current driver 20-3. Then, when the down counter 20-24 terminates counting, the analog switch 20-25 is turned OFF and the voltage value +V is inputted to the constant current driver 20-3. Accordingly, the constant current is supplied to the display segment during 10 ms. Such a pulse width designation data and the START pulse are outputted from the CPU at the above-described supply intervals of 20 ms. In other words, by supplying these pulse width designation data and START pulse for each 30 ms, the decoloration current pulses as shown in FIG. 7 are intermittently and repeatedly supplied to the display segment.

Further, the amount of the current to flow at the time of coloration or at the time of decoloration is determined such that a voltage generated in the display segment due to this current is higher than a necessary voltage for coloring or decoloring the display segment and lower than a limitation voltage by which the display segment is not damaged.

Next, decoloration ending means according to the first embodiment for ending decoloration step by determining end of the decoloration step will be described.

The display segment has characteristics that an electric resistance value of the display segment is increased and the electromotive force is generated in the display segment as decoloration progresses. The decoloration ending means according to the first embodiment has means for detecting end of the decoloration step on the basis of the value of this electromotive force by using the characteristic that the electromotive force is generated among them.

In other words, upon decoloration, if the decoloration current pulse is supplied at the above-described intervals intermittently and repeatedly, as shown in FIG. 7, in response to its supply state, the voltage generated in the display segment also moves up and down. When the decoloration does not progress, the voltage generated in the display segment when the decoloration current pulse is not supplied returns to nearly 0 volt.

Then, further, by repeatedly supplying the decoloration current pulse at the above-described intervals, when decoloration progresses to some degrees, the resistance value of the display segment is increased, and as shown in FIG. 7, the voltage is increased. In addition, as a voltage when the decoloration current pulse is not supplied, an electromotive force generated in the display segment appears. Therefore, when the decoloration current pulse is not supplied, for example, just before next decoloration current pulse is supplied, the voltage detection circuit 20-4 detects the voltage value of this electromotive force generated in the display segment. Then, by determining that decoloration is terminated when this detected voltage value is not less than the decoloration step ending voltage Vr which is a reference value (a first reference value) set in advance, the CPU (not illustrated) ends the supply operation of the decoloration current pulse and ends the decoloration step.

Next, a method for setting the decoloration step ending voltage Vr which is the reference value will be described.

Figure 8:
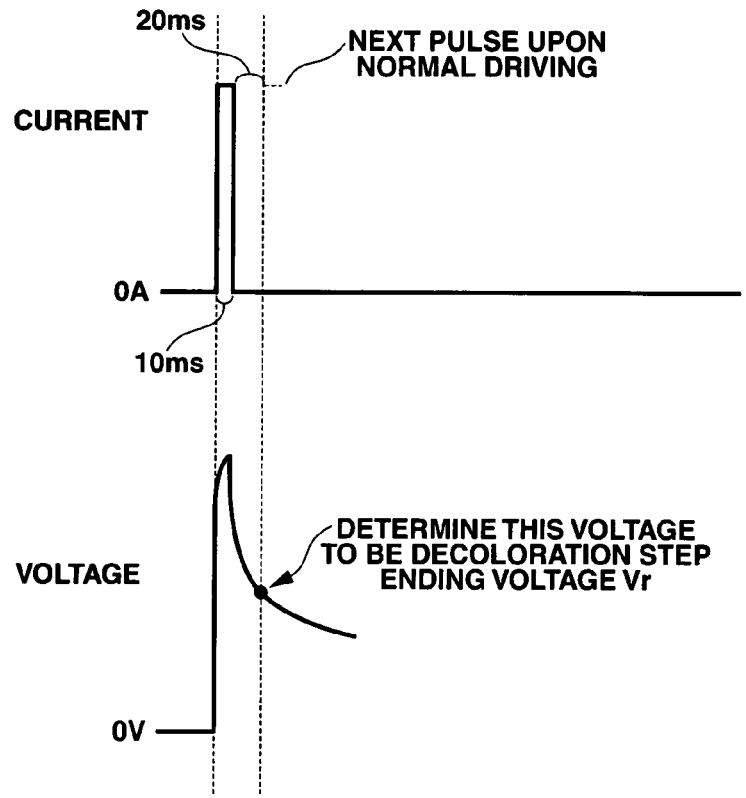
FIG. 8 is a view explaining a method for setting a decoloration step ending voltage Vr according to the first embodiment.

FIG. 8 is a view explaining a method for setting the decoloration step ending voltage Vr according to the first embodiment of the present invention.

When setting the decoloration step ending voltage Vr, a current pulse having a current value and an supplying time equal to the decoloration current pulse is supplied once to the display segment in the state that the initial property is kept. Here, the state that the initial property is kept ideally includes an initial state that a current has never been supplied after manufactured. However, this state may also include the display segment in the state that the initial property is nearly recovered by sufficiently discharging the accumulated electric charges by grounding an electrode of the display segment for a predetermined time or more. Under such a state that the initial property is kept, the coloration step is not performed yet. Thus, when the current pulse is supplied only once as described above, the display segment is made in the excess decoloration state and an electromotive force is generated in the display segment. Then, a voltage value to be detected by the voltage detection circuit 20-4 after a predetermined time (=a supply interval between two decoloration current pulses in the decoloration step as shown in the above-described FIG. 7: 20 ms according to the present embodiment) is adopted as the above-described decoloration step ending voltage Vr. By carrying out this operation for each display segment, the decoloration step ending voltage Vr is set for each display segment. In other words, when the voltage value detected by the voltage detection circuit 20-4 becomes this decoloration step ending voltage Vr in the decoloration step of each display segment, the relevant display segment results in the state that the decoloration is completed, so that this time is determined to be the end of decoloration.

This decoloration step ending voltage Vr is saved in an inner memory of the CPU (not illustrated) and a memory that the CPU can access. Alternatively, it may be also possible that, by saving the decoloration step ending voltage Vr in the segment profile memory 30, the CPU reads out the decoloration step ending voltage Vr from the segment profile memory 30 upon start of the decoloration step and uses it.

According to such a method, it is possible to set the decoloration step ending voltage Vr for each display segment.

As described above, according to the present embodiment, since the decoloration current to flow in the decoloration step is determined to be not continuous supply of the constant current but current pulses in plural times that a constant current is outputted intermittently and repeatedly, the state of the electromotive force generated in the display segment when the constant current is not supplied can be observed and in response to this electromotive force, it is determined if the decoloration step is ended or not. Therefore, even when it takes a long time from the coloration step up to the decoloration step and a natural decoloration is caused to some degrees, it is possible to appropriately determine the end of the decoloration step.

Second Embodiment

Next, a second embodiment according to the present invention will be described.

Since the configuration of a display drive device according to the second embodiment is equal to that of the above-described first embodiment, the illustration and the description are herein omitted. However, according to the present embodiment, a voltage detection circuit 20-4 also detects a current flowing from the output terminal of a constant current driver 20-3 toward a positive power source +V and a voltage generated in response to a load (the resistance of the display segment, the wiring resistance or the like) which is connected to the constant current driver 20-3 when the constant current is supplied in the decoloration current pulse and then, the voltage detection circuit 20-4 inputs its voltage value in a CPU (not illustrated) via a system interface 40.

It is obvious that the voltage in response to the electromotive force generated in the display segment is detected when the decoloration current pulse is not supplied, namely, when the current is not outputted from the constant current driver 20-3, and its voltage value is inputted in the CPU (not illustrated) via the system interface 40 as in the above-described first embodiment. In other words, according to the second embodiment, an electric resistance of the display segment which is increased as the decoloration progresses and an electromotive force generated in the display segment as the decoloration progresses are detected as a voltage value by means of the voltage detection circuit 20-4, respectively.

Figure 9:
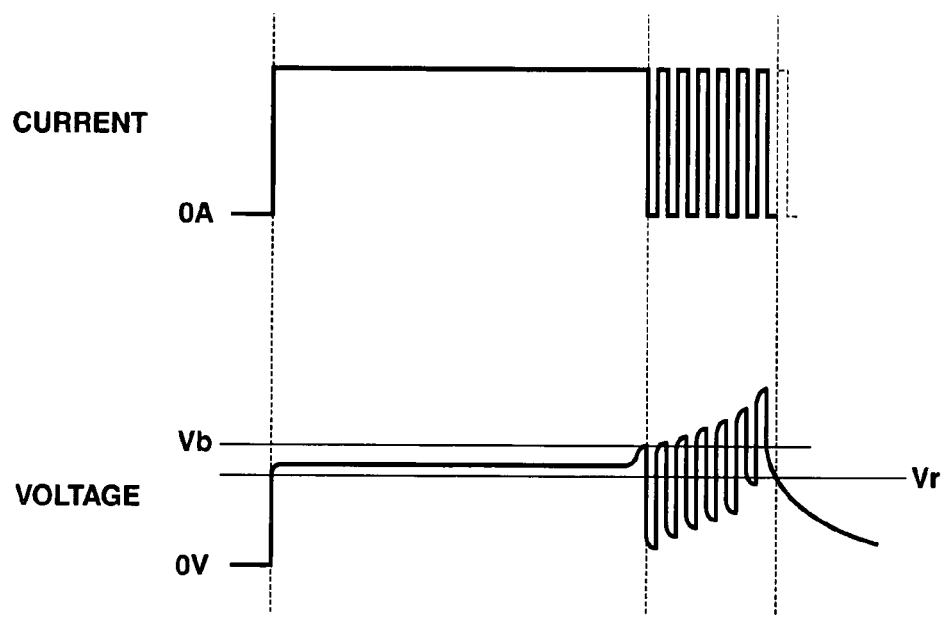
FIG. 9 is a timing chart showing a change of a current and a voltage in the decoloration step by means of a display drive device according to a second embodiment.

FIG. 9 is a timing chart showing a change of a current and a voltage in the decoloration step by means of the display drive device according to the second embodiment.

Further, since the coloration step is equal to that in the above-describe first embodiment, the illustration and the description are herein omitted.

According to the second embodiment, in the initial step of the decoloration step, namely, on the part where the resistance value of the display segment is not largely changed, the constant current is continuously supplied. On the part where the resistance value of the display segment is largely changed, as in the first embodiment, the decoloration current pulse to output the constant current is supplied intermittently and repeatedly.

According to the decoloration ending means of the second embodiment is the same, as in the first embodiment. After the voltage value detected by the voltage detection circuit 20-4 when the decoloration current pulse is not supplied becomes equal to or greater than the decoloration step ending voltage Vr under the state that the decoloration current pulse is supplied intermittently and repeatedly, the decoloration step is ended.

Thereby, when the amount of the electric charge to be injected in the display segment in the decoloration step is made equal, it is possible to make a time required for the decoloration step shorter than the case of the first embodiment.

Here, continuous supply of the constant current is changed to intermittent supply of the decoloration current pulse when the voltage value upon supply of the constant current detected by the voltage detection circuit 20-4 exceeds a threshold value Vb set in advance in accordance with change of the resistance value of the display segment.

Next, an example of a method for setting this threshold value Vb will be described.

Figure 10:
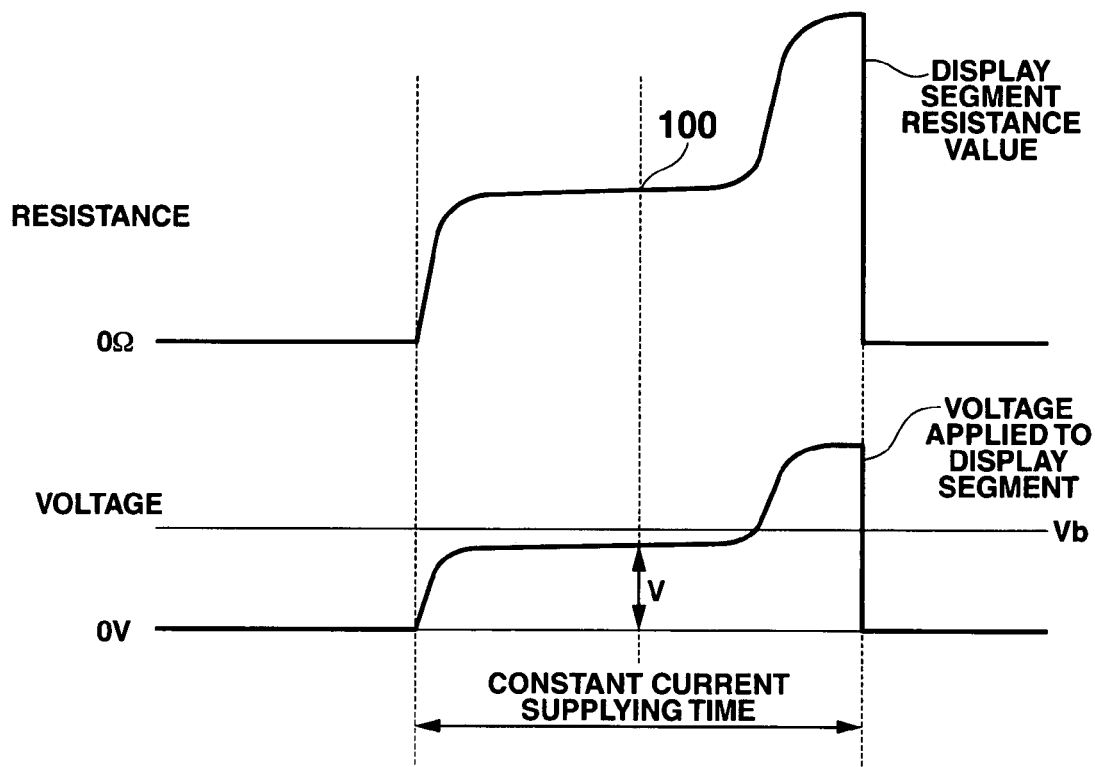
FIG. 10 is a view explaining a method for setting a threshold value Vb according to the second embodiment.

FIG. 10 is a view explaining a method for setting the threshold value Vb according to the second embodiment.

Upon setting of the threshold value Vb, at first, a solute in the electrolyte is separated out by carrying out coloration for an arbitrary time. Next, by carrying out decoloration while detecting the voltage generated in the display segment by means of the voltage detection circuit 20-4, the voltage value on the part where the resistance value is not changed largely (for example, the part represented by a reference numeral 100 in FIG. 10) is detected. In addition, a limitation voltage by which the display segment is not damaged has been detected together with this voltage value, and on the basis of a condition such as a ratio of the voltages and a noise component of a detected voltage, a predetermined number times of the part where the resistance value is not changed largely is determined to be the threshold value Vb. Further, the experiment of the present applicant has resulted in that the threshold value Vb is preferably set to be, for example, 1.15 times of the voltage on the part where the resistance value is not changed largely.

According to such a method, it is possible to set the threshold value Vb for each display segment. In addition, the voltage generated in the display segment is detected with the effect of the wiring resistance up to the display segment included. As a result, by setting the threshold value Vb according to the above-described method, it is not necessary to set the threshold value Vb by calculating the wiring resistance for each display segment.

Further, according to the above-described example, a predetermined number times of the part where the resistance value is not changed largely is determined to be a threshold value Vb. However, the threshold value may be set according to a method for adding a predetermined voltage value to the voltage value of the part where the resistance value is not changed largely.

In addition, the threshold value Vb may be set in the processing of the initial setting when a power source is supplied. However, when the state of the display drive device is changed due to change of an ambient environment such as a temperature, the threshold value Vb needs to be changed. Accordingly, it is preferable that the threshold value Vb is set every time the decoloration is carried out.

In addition, the threshold value Vb may be set every time the decoloration of a predetermined number of times is carried out.

Third Embodiment

Next, a third embodiment according to the present invention will be described.

Further, since the configuration of the display drive device is equal to that of the above-described second embodiment, the illustration and the description thereof are herein omitted. However, in the present embodiment, two kinds of current values i1 and i2 are further stored in a segment profile memory 30.

Figure 11:
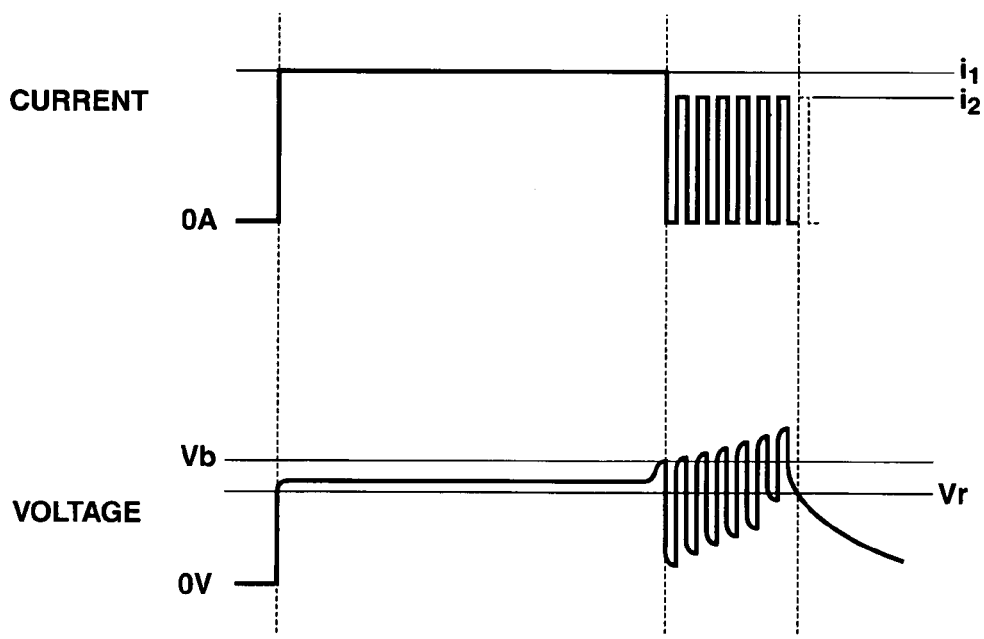
FIG. 11 is a timing chart showing a change of a current and a voltage in the decoloration step by means of a display drive device according to a third embodiment.

FIG. 11 is a timing chart showing a change of the current and the voltage in the decoloration step by means of the display drive device according to the third embodiment.

Since the coloration step is equal to that in the above-described embodiment, the illustration and the description thereof are herein omitted.

According to the second embodiment, as shown in FIG. 10, on the part where the resistance value of the display segment is not largely changed, the constant current is continuously supplied as a decoloration current pulse, and on the part where the resistance value of the display segment is largely changed, the decoloration current pulse to output the constant current is supplied intermittently and repeatedly. Then, the current values of respective constant currents are made equal.

On the contrary, according to the third embodiment, as shown in FIG. 11, when intermittently and repeatedly outputting the decoloration current pulse, its current value i2 is made smaller than the current value i1, which is obtained when the constant current is continuously supplied.

Further, the decoloration ending means of the present embodiment is the same as in the above-described second embodiment. After the voltage value detected by a voltage detection circuit 20-4 when the decoloration current pulse is not supplied becomes equal to or greater than the decoloration step ending voltage Vr under the state that the decoloration current pulse is supplied intermittently and repeatedly, the decoloration step is ended.

According to such a third embodiment, the voltage is increased as the resistance value of the display segment is increased. However, on this part where the resistance value is largely changed, the current value of the constant current is decreased, so that it is possible to reliably prevent the display segment from being damaged due to increase in voltage depending on increase of a resistance value.

In the present embodiment, it is assumed that both of these current values i1 and i2 are stored in the segment profile memory 30. However, they may be stored in a storage device which is different from the segment profile memory 30.

Fourth Embodiment

Next, a fourth embodiment according to the present invention will be described.

Since the configuration of the display drive device according to the fourth embodiment is equal to that of the above-described first embodiment, the illustration and the description thereof are herein omitted.

Figure 12:
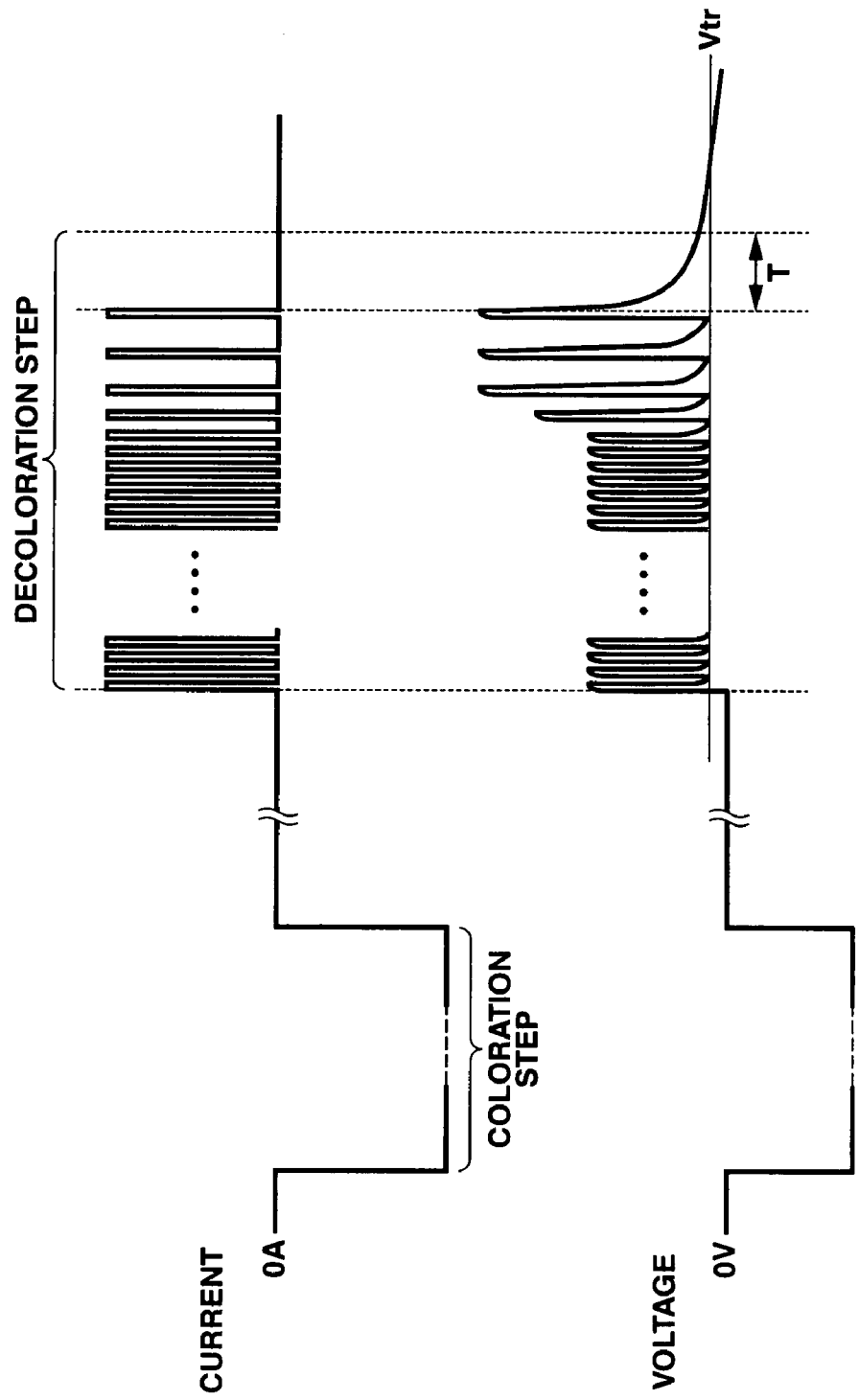
FIG. 12 is a timing chart showing a change of a current to be supplied from a constant current supply circuit to a display segment upon coloration and decoloration and a change of a voltage generated by this current according to a fourth embodiment.

FIG. 12 is a timing chart showing a change of a current to be supplied from a constant current supply circuit to a display segment upon coloration and decoloration and a change of a voltage generated by this current according to the fourth embodiment.

In FIG. 12, the upper side of the drawing is determined to be a positive direction and the lower side thereof is determined to be a negative direction.

According to the present embodiment, as shown in FIG. 12, the coloration current pulse is equal to that of the above-described first embodiment, and for example, is supplied to the display segment as one coloration current pulse made of a continuous constant current. This coloration current pulse is a pulse having a pulse width designated by the pulse width designation data and a negative constant current (the current from the display segment 10-1 toward the constant current driver 20-3) designated by the current value designation data, and this coloration current pulse is equal to the coloration current pulse according to the first embodiment. When such a coloration current pulse is supplied to the display segment, a negative electric charge equivalent to its supplied current×its supplying time is injected in the relevant display segment and coloration is caused, and by allowing the supplying time of the constant current to be supplied to the display segment to be variable, it is possible to accurately control the amount of the electric charge to be injected in the display segment.

As in the case of the first embodiment, the decoloration current pulse is assumed to be a plurality of current pulses where supply of the constant current for a predetermined time is intermittently repeated. In this case, each current pulse is a pulse having a predetermined pulse width designated by the pulse width designation data and a predetermined positive constant current (the current from the constant current driver 20-3 toward the display segment 10-1) designated by the current value designation data. When such a decoloration current pulse is supplied to the display segment, a positive electric charge equivalent to its supplied current×its supply time is injected in the relevant display segment and decoloration is caused. Further, according to the present embodiment, as an example, the supply time of each decoloration current pulse is defined to be 10 ms.

On the other hand, according to the first embodiment, it is assumed that the supply interval among respective decoloration current pulses is fixed to a predetermined value and respective decoloration current pulses are repeatedly supplied at a predetermined supply interval. However, according to the fourth embodiment, the supply interval among respective decoloration current pulses is not fixed but it is appropriately changed. In other words, every time a voltage value to be detected by the voltage detection circuit 20-4 of the constant current supply circuit 20 reaches the decoloration current pulse supplied trigger voltage Vtr which is a reference value (a second reference value) set in advance, the supply interval is controlled so that the decoloration current pulse for a pre-determine time is outputted from the constant current supply circuit 20.

In other words, the above-described pulse width designation data equivalent to 10 ms is written from the CPU (not illustrated) to the pulse width register 20-21 of the decoloration current pulse generator 20-2 via the system interface 40 and the START pulse is supplied to the down counter 20-24 of the decoloration current pulse generator 20-2. Thereby, as described above, since the analog switch 20-25 is turned ON only when the down counter 20-24 is counting the above-described pulse width designation data equivalent to the 10 ms. As a result, the decoloration current pulse having a voltage value obtained by the DA converter 20-23 is inputted to the constant current driver 20-3. Then, when the down counter 20-24 terminates counting, the analog switch 20-25 is turned OFF and the voltage value +V is inputted to the constant current driver 20-3. Accordingly, the constant current is supplied to the display segment during 10 ms intermittently and repeatedly.

The display segment has characteristics such that an electric resistance value of the display segment is increased and the electromotive force is generated in the display segment as decoloration progresses. Among them, the electromotive force may appear as a voltage of the output terminal of the constant current driver 20-3 when the decoloration current pulse for a predetermine time as described above is not supplied. According to the present embodiment, its voltage value is detected by the voltage detection circuit 20-4 to be inputted to the CPU (not illustrated) via the system interface 40. Then, the CPU may compare this detected voltage value with the decoloration current pulse supplied trigger voltage Vtr set in advance. Then, when the detected voltage value reaches the decoloration current pulse supplied trigger voltage Vtr, the CPU writes the above-described pulse width designation data equivalent to 10 ms in the pulse width register 20-21 of the decoloration current pulse generator 20-2 via the system interface 40 and the START pulse is supplied to the down counter 20-24 of the decoloration current pulse generator 20-2.

In this manner, the decoloration current pulse for a predetermined time is supplied intermittently and repeatedly in the display segment. Further, the amount of the current to flow at the time of coloration or at the time of decoloration is determined such that a voltage generated in the display segment due to this current is higher than a necessary voltage for coloring or decoloring the display segment and lower than a limitation voltage by which the display segment is not damaged.

Next, decoloration ending means according to the forth embodiment for ending decoloration step by determining the end of the decoloration step will be described.

Upon decoloration, the unillustrated CPU counts a time after supply of each decoloration current pulse till the detected voltage value of the voltage detection circuit 20-4 reaches the decoloration current pulse supplied trigger voltage Vtr. Then, in the case where this counted time is shorter than the determination time (the first determination time) T set in advance, namely, when the voltage value to be detected by the voltage detection circuit 20-4 reaches the decoloration current pulse supplied trigger voltage Vtr before the preset determination time T has elapsed, the decoloration current pulse is supplied repeatedly. Due to this operation, the decoloration current pulse is supplied intermittently and repeatedly.

If the decoloration current pulse is supplied intermittently and repeatedly as described above, in response to repeated supply of the current pulse, the electromotive force generated in the display segment is changed. However, when the decoloration does not progress, the electromotive force is hardly generated, so that the voltage of the display segment returns to the decoloration current pulse supplied trigger voltage Vtr for nearly a fixed time after the end of supply of the current pulse. Therefore, this results in that the decoloration current pulse is supplied repeatedly at nearly constant intervals.

Then, when the decoloration current pulse is further supplied repeatedly and the decoloration progresses to some degree, an electromotive force generated in the display segment starts to appear on the detected voltage when the decoloration current pulse is not supplied. Thereby, a time required for the voltage of the display segment to reach to the decoloration current pulse supplied trigger voltage Vtr after supply of the current pulse is gradually increased. Therefore, as shown in FIG. 12, the supply interval of the decoloration current pulse is gradually longer with the course of time.

Then, in the case where the counted time after supply of each decoloration current pulse till the detected voltage value reaches the decoloration current pulse supplied trigger voltage Vtr reaches the determination time T, namely, when the voltage value to be detected by the voltage detection circuit 20-4 does not reach the decoloration current pulse supplied trigger voltage Vtr before the preset determination time T has elapsed, the CPU determines that the decoloration is ended, ends the above-described supply operation of the decoloration current pulse, and ends the decoloration step.

Next, an example of a method for setting the decoloration current pulse supplied trigger voltage Vtr which is the second reference value will be described.

Figure 13:
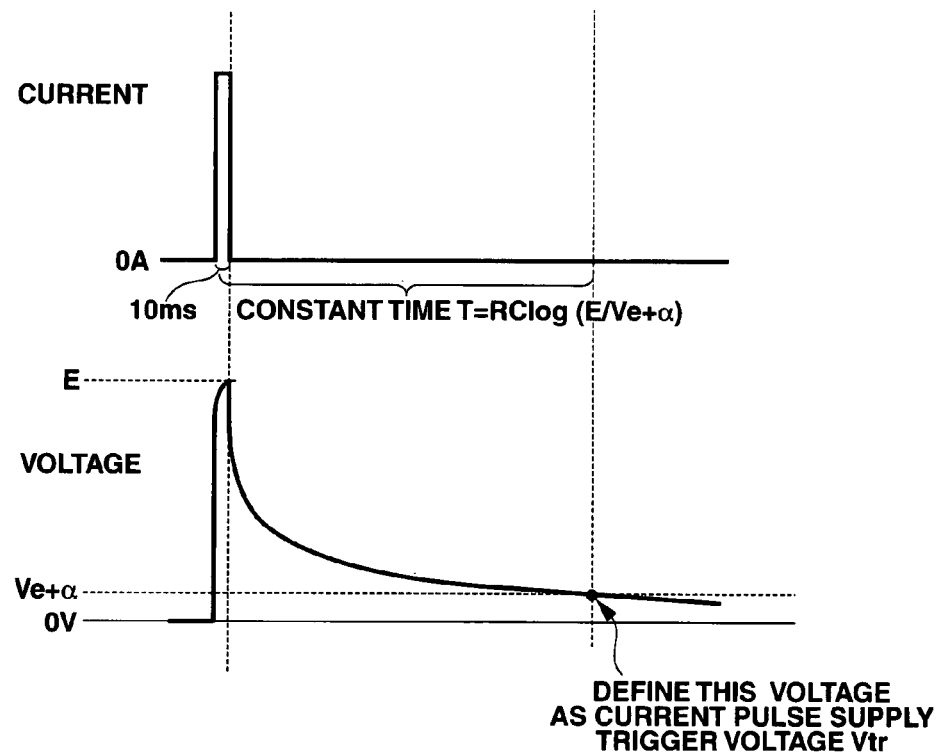
FIG. 13 is a view explaining a method for setting a decoloration current pulse supplied trigger voltage Vtr according to the fourth embodiment.

FIG. 13 is a view explaining a method for setting a decoloration current pulse supplied trigger voltage Vtr according to the fourth embodiment.

At first, the determination time T will be described. When the decoloration is ended, the display segment generates an electromotive force Ve. In addition, the display segment after supply of an erasing pulse can be considered as a model of a simple capacitor. As a result, a voltage V of the display segment after supply of the erasing pulse can be represented by the following formula (1).

$$V = E \exp(-t/RC) + Ve \quad (1)$$

(where, E: a voltage of the display segment just after supply of the current pulse, R: a wiring resistance, C: an electric capacity when the display segment is considered as a capacitor)

Then, in the case where the ending voltage of the decoloration step is set to Ve+α, the determination time T is represented by the following formula (2).

$$T = RC \log(E/Ve+\alpha)) \tag{2}$$

Then, in the display segment with the initial property kept, the current pulse having the same current value and the same supply time as those of the decoloration current pulse is supplied once. In this case, the state where the initial property is kept ideally includes an initial state that a current has never been supplied after manufactured. However, this state may also include the display segment in the state that the initial property is almost recovered by sufficiently discharging the accumulated electric charges by grounding an electrode of the display segment for a predetermined time or more. Under such a state that the initial property is kept, the coloration step is not performed yet. Thus, when the current pulse is supplied only once as described above, the display segment is made in the excess decoloration state and an electromotive force Ve is generated in the display segment. Then, a voltage value to be detected by the voltage detection circuit 20-4 after the predetermined time T has passed (=the ending voltage of the decoloration step: Ve+α) is adopted as the above-described decoloration current pulse supplied trigger voltage Vtr. By carrying out this operation for each display segment, the decoloration current pulse supplied trigger voltage Vtr is set for each display segment. In other words, when the voltage value detected by the voltage detection circuit 20-4 becomes this decoloration current pulse supplied trigger voltage Vtr after the predetermined time T has passed in the decoloration step of each display segment, the relevant display segment results in the state that the decoloration is completed, so that this time is determined to be the end of decoloration.

Further, the value α in the decoloration step ending voltage Ve+α can be arbitrarily set. However, the smaller this value α is, the longer the determination time T becomes, i.e., the longer the time till the end of decoloration is detected becomes, so that a time required for the decoloration step of the display segment is made longer. Therefore, it is preferable that the value α is set to a value where the determination time T becomes a time so as not to pose a problem for a driving timing of the display segment. In this case, the determination time T is set to about 3 sec, for example.

This decoloration current pulse supplied trigger voltage Vtr is saved in an inner memory of the unillustrated CPU and a memory which the CPU can access. Alternatively, by saving it in the segment profile memory 30, the CPU may read out it from the segment profile memory 30 upon start of the decoloration step for use.

According to such a method, it is possible to set the decoloration current pulse supplied trigger voltage Vtr for each display segment.

As described above, according to the fourth embodiment, since the decoloration current to flow in the decoloration step is determined to be not continuous supply of the constant current but current pulses in plural times that a constant current for a predetermined time is outputted repeatedly. Therefore, the state of the electromotive force generated in the display segment when the constant current is not supplied can be observed, and on the basis of a time for which the voltage of the display segment due to this electromotive force is discharged up to the decoloration current pulse supplied trigger voltage Vtr, it is determined if the decoloration step is ended or not. Therefore, even when it takes a long time from the coloration step up to the decoloration step and a natural decoloration is caused to some degrees, it is possible to appropriately determine the end of the decoloration step.

Fifth Embodiment

Next, a fifth embodiment according to the present invention will be described.

Since the configuration of a display drive device according to the fifth embodiment is equal to that in the above-described forth embodiment, the illustration and the description thereof are herein omitted. However, according to the present embodiment, a voltage detection circuit 20-4 also detects a current flowing from the output terminal of a constant current driver 20-3 toward a positive power source +V and a voltage generated in response to a load (the resistance of the display segment, the wiring resistance or the like) which is connected to the constant current driver 20-3 when the constant current is supplied in the decoloration current pulse and then, the voltage detection circuit 20-4 inputs its voltage value in a CPU (not illustrated) via a system interface 40.

As a matter of course, as in the fourth embodiment, when the decoloration current pulse is not supplied, namely, when the current is not outputted from the constant current driver 20-3, by detecting a voltage in response to the electromotive force generated in the display segment, its voltage value is inputted to the unillustrated CPU via the system interface 40. In other words, according to the fifth embodiment, an electric resistance of the display segment which is increased as the decoloration progresses and an electromotive force generated in the display segment as the decoloration progresses are detected as a voltage value by means of the voltage detection circuit 20-4, respectively.

Figure 14:
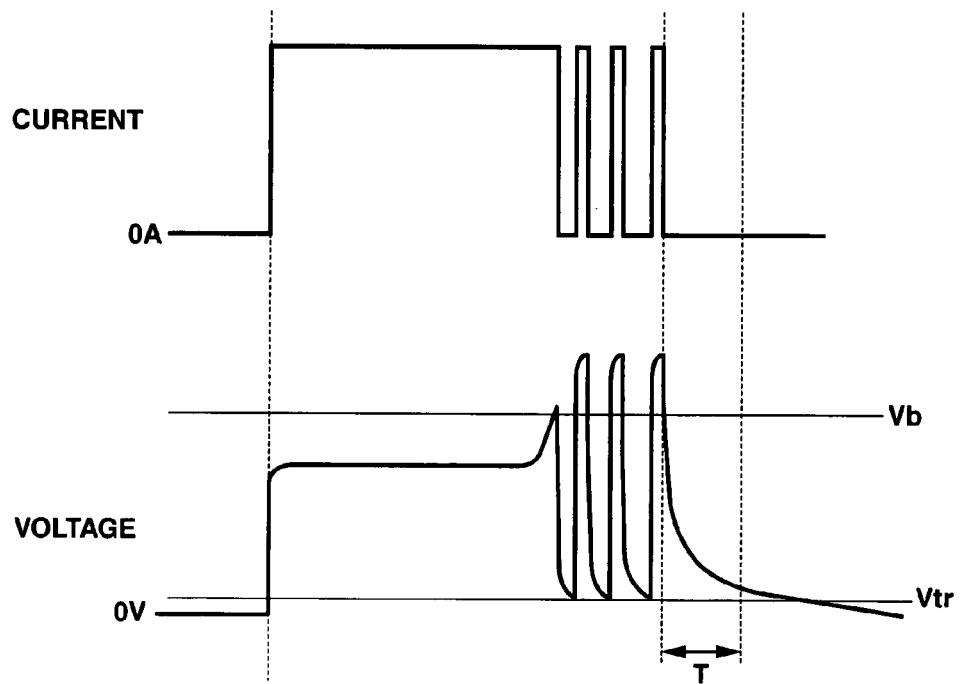
FIG. 14 is a timing chart showing a change of a current and a voltage in the decoloration step by means of a display drive device according to a fifth embodiment.

FIG. 14 is a timing chart showing a change of a current and a voltage in the decoloration step by means of the display drive device according to the fifth embodiment.

Since the coloration step is equal to that in the first embodiment, the illustration and the description thereof are herein omitted.

According to the fifth embodiment, as shown in FIG. 14, in the initial step of the decoloration step, namely, on the part where the resistance value of the display segment is not largely changed, the constant current is continuously supplied. On the part where the resistance value of the display segment is largely changed, as in the fourth embodiment, the decoloration current pulse to output the constant current is supplied intermittently and repeatedly.

As in the fourth embodiment, in the case where a time after supply of each decoloration current pulse till the voltage value detected by the voltage detection circuit 20-4 reaches the decoloration current pulse supplied trigger voltage Vtr reaches the determination time T, the decoloration ending means of the fifth embodiment ends the decoloration step.

Thereby, when the amounts of electric charges to be injected in the display segment in the decoloration step are the same, a time required for the decoloration step can be shorter than the case of the fourth embodiment.

Here, continuous supply of the constant current is changed to intermittent supply of the decoloration current pulse when the voltage value upon supply of the constant current detected by the voltage detection circuit 20-4 exceeds a threshold value Vb set in advance in accordance with change of the resistance value of the display segment. As in the threshold value Vb according to the above-described second embodiment, this threshold value Vb can be set according to the same method as the setting method described with reference to FIG. 10.

Sixth Embodiment

Next, a sixth embodiment according to the present invention will be described.

Since the configuration of a display drive device according to the sixth embodiment is equal to that of the above-described fifth embodiment, the illustration and the description thereof are herein omitted. However, in the present embodiment, two kinds of current values i1 and i2 are further stored in a segment profile memory 30.

Figure 15:
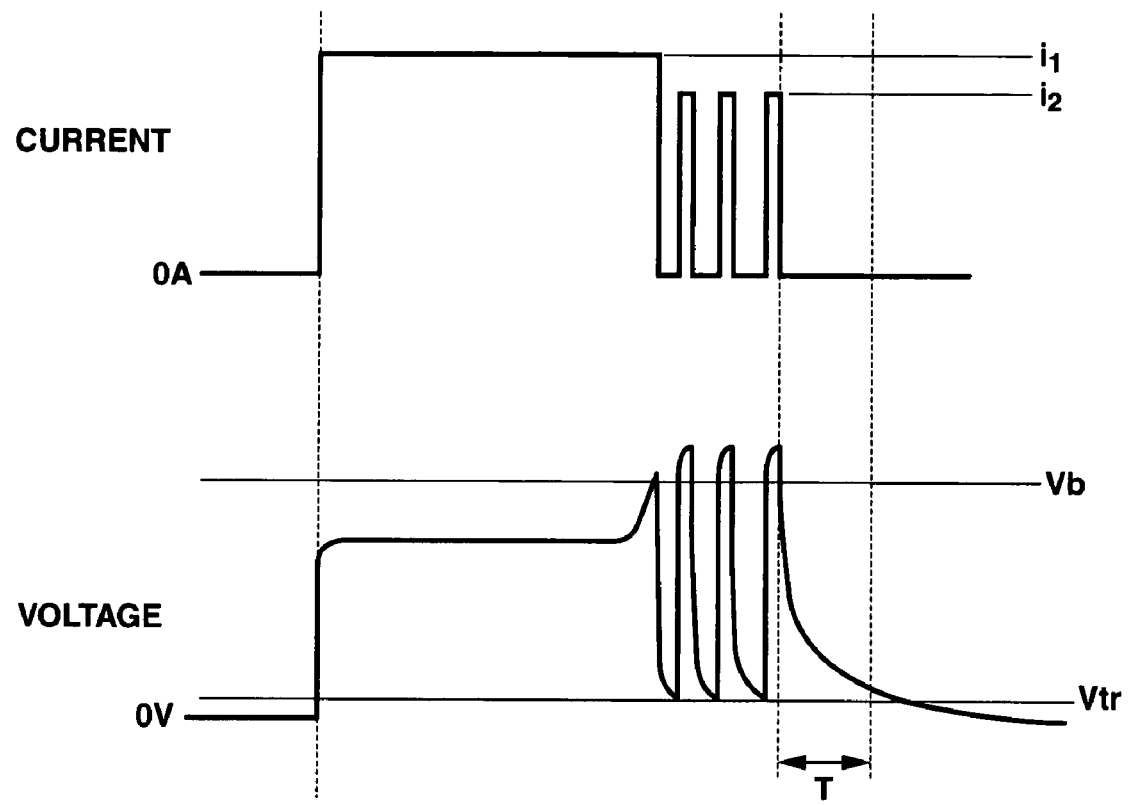
FIG. 15 is a timing chart showing a change of a current and a voltage in the decoloration step by means of a display drive device according to a sixth embodiment.

FIG. 15 is a timing chart showing a change of the current and the voltage in the decoloration step by means of the display drive device according to the sixth embodiment.

Since the coloration step is equal to the above-described first embodiment, the illustration and the description thereof are herein omitted.

According to the fifth embodiment, as shown in FIG. 14, on the part where the resistance value of the display segment is not largely changed, the constant current is continuously supplied as a decoloration current pulse, and on the part where the resistance value of the display segment is largely changed, the decoloration current pulse is supplied intermittently and repeatedly. Then, the current values of respective constant currents are made equal.

On the contrary, according to the sixth embodiment, as shown in FIG. 11, when intermittently and repeatedly outputting the current pulse, its current value i2 is made smaller than the current value i1, which is obtained when the constant current is continuously supplied.

Further, as in the above-described fifth embodiment, in the case where a time after supply of each decoloration current pulse till the voltage value detected by the voltage detection circuit 20-4 reaches the decoloration current pulse supplied trigger voltage Vtr reaches the determination time T, the decoloration ending means of the present embodiment ends the decoloration step.

According to the sixth embodiment, the voltage is increased as the resistance value of the display segment is increased. However, on the part where the resistance value is largely changed, the current value of the constant current is decreased, so that it is possible to reliably prevent the display segment from being damaged due to increase in voltage depending on increase of the resistance value.

In the present embodiment, it is assumed that both of these current values i1 and i2 are stored in the segment profile memory 30. However, they may be stored in a storage device which is different from the segment profile memory 30.

Seventh Embodiment

Next, a seventh embodiment according to the present invention will be described.

Since the configuration of a display drive device according to the seventh embodiment is equal to that of the above-described fourth embodiment, the illustration and the description thereof are herein omitted.

Figure 16:
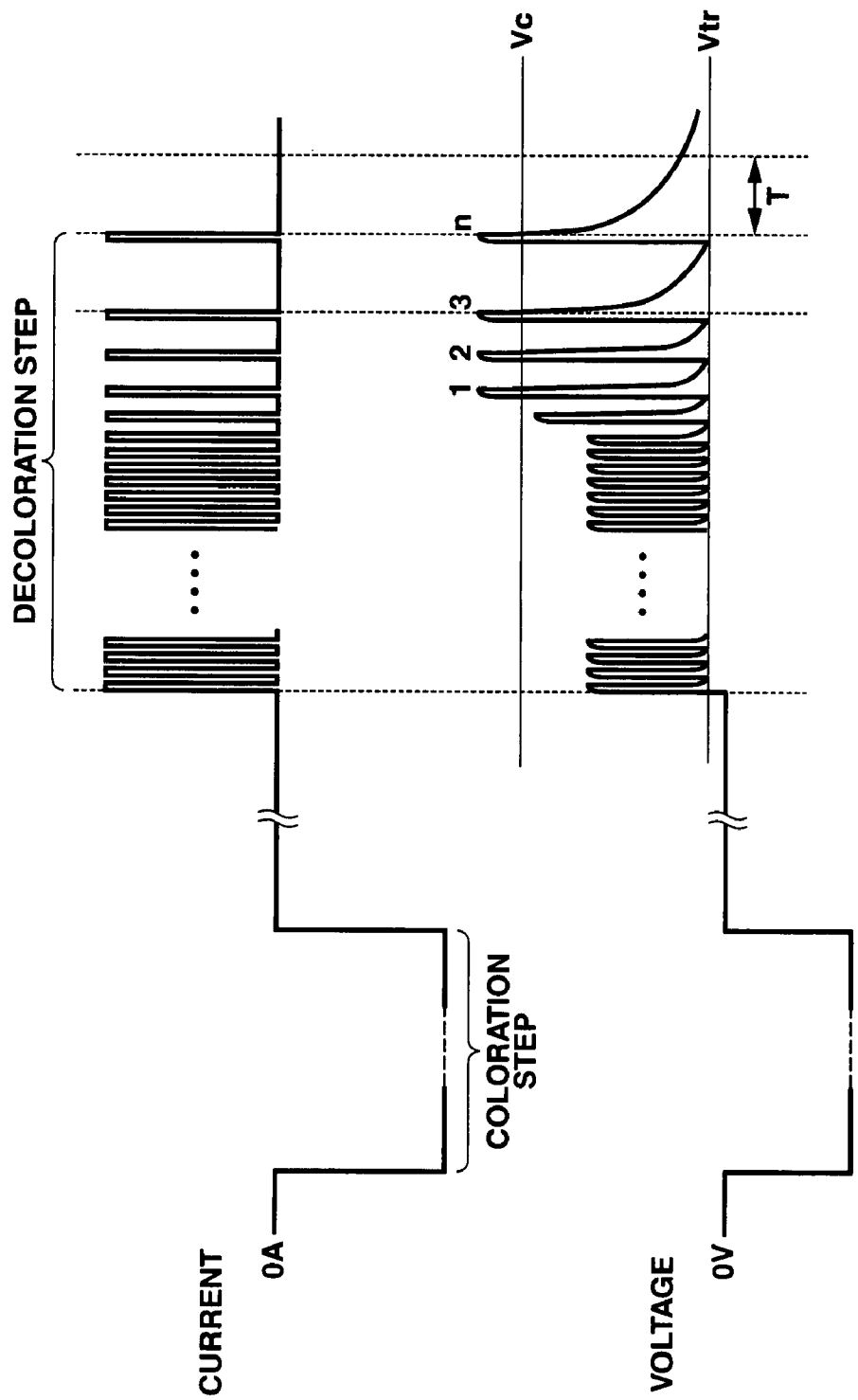
FIG. 16 is a timing chart showing a first example of a change of a current to be supplied from a constant current supply circuit 20 to a display segment upon coloration and decoloration and a change of a voltage generated by this current according to a seventh embodiment.

FIG. 16 is a timing chart showing a first example of a change of a current to be supplied from the constant current supply circuit 20 to the display segment upon coloration and decoloration and a change of a voltage generated by this current according to the seventh embodiment.

Figure 17:
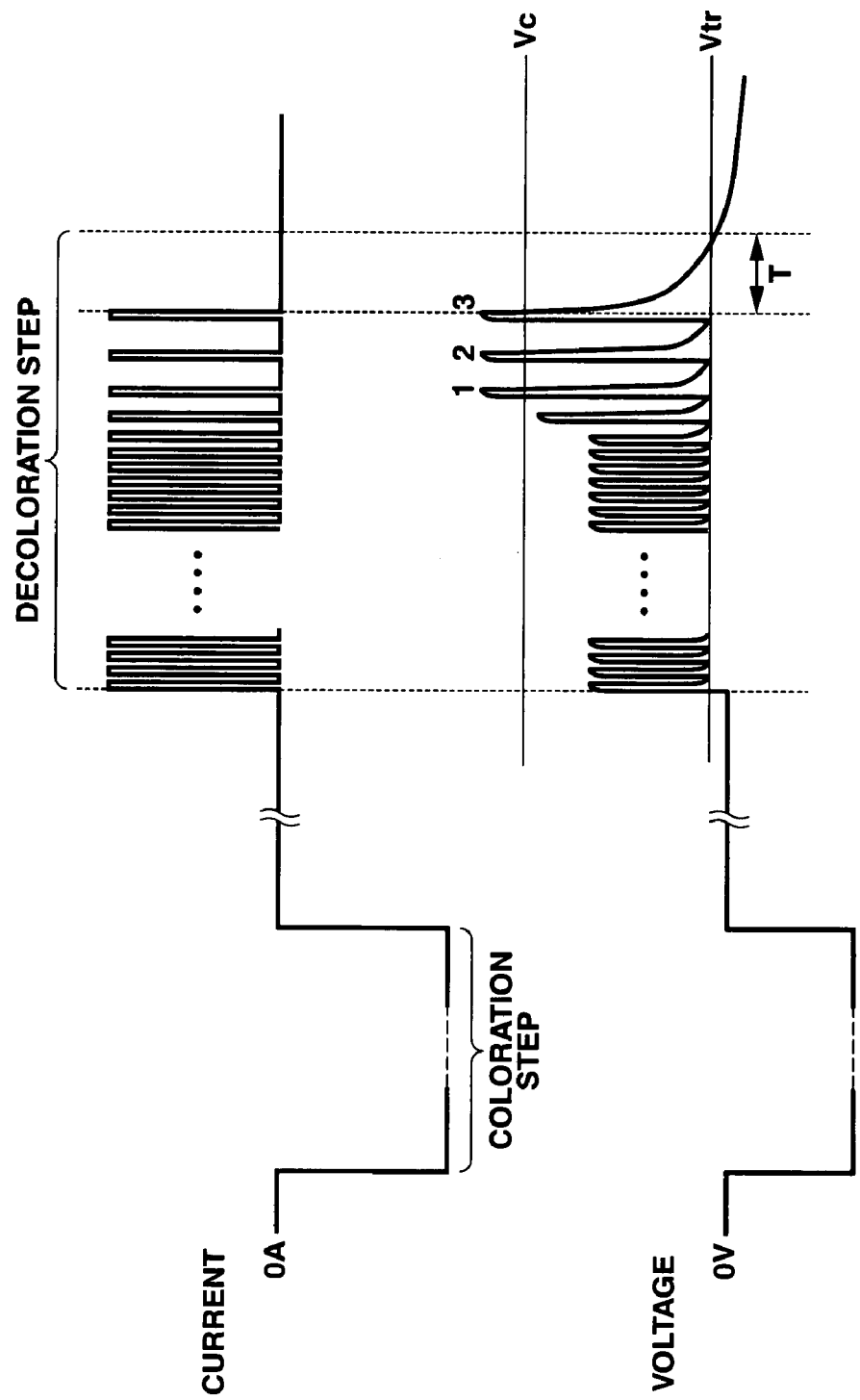
FIG. 17 is a timing chart showing a second example of a change of a current to be supplied from the constant current supply circuit 20 to the display segment upon coloration and decoloration and a change of a voltage generated by this current according to the seventh embodiment.

FIG. 17 is a timing chart showing a second example of a change of a current to be supplied from the constant current supply circuit 20 to the display segment upon coloration and decoloration and a change of a voltage generated by this current according to the seventh embodiment.

Further, in these FIGS. 16 and 17, the upper side of the drawing is determined to be a positive direction and the lower side thereof is determined to be a negative direction.

According to the present embodiment, as shown in FIG. 16, the coloration current pulse is equal to that of the above-described first embodiment, and for example, as one coloration current pulse made of a continuous constant current, the coloration current pulse is supplied to the display segment. This coloration current pulse is a pulse having a pulse width designated by the pulse width designation data and a negative constant current (the current from the display segment 10-1 toward the constant current driver 20-3) designated by the current value designation data, and this coloration current pulse is equal to the coloration current pulse according to the first embodiment. When such a coloration current pulse is supplied to the display segment, a negative electric charge equivalent to its supplied current×its supply time is injected in the relevant display segment and coloration is caused, and by allowing the supply time of the constant current to be supplied to the display segment to be variable, it is possible to accurately control the amount of the electric charge to be injected in the display segment.

On the other hand, as in the case of the forth embodiment, the decoloration current pulse is defined to be a plurality of current pulses where supply of the constant current for a predetermined time, for example, 10 ms is intermittently repeated. In this case, one current pulse is a pulse having a predetermined pulse width designated by the pulse width designation data and a predetermined positive constant current (the current from the constant current driver 20-3 toward the display segment 10-1) designated by the current value designation data. In addition, as in the case of the fourth embodiment, the interval between respective decoloration current pulses is not fixed but is appropriately changed, and every time a voltage value to be detected by the voltage detection circuit 20-4 of the constant current supply circuit 20 reaches the decoloration current pulse supplied trigger voltage Vtr which is a reference value (a third reference value) set in advance, the decoloration current pulse for a predetermine time is outputted from the constant current supply circuit 20.

Next, decoloration ending means according to the seventh embodiment for ending decoloration step by determining the end of the decoloration step will be described.

The decoloration ending means according to the present embodiment is provided with other means for determining the end of the decoloration step in addition to the decoloration ending means according to the fourth embodiment.

In other words, as described later, in the above-described decoloration ending means according to the fourth embodiment, the decoloration step may not be appropriately ended. On the contrary, the decoloration ending means according to the seventh embodiment can reliably end the decoloration step even in such a case.

In other words, upon decoloration, as in the fourth embodiment, the unillustrated CPU counts a time after supply of each decoloration current pulse till the detected voltage value of the voltage detection circuit 20-4 reaches the decoloration current pulse supplied trigger voltage Vtr. Then, in the case where this counted time is shorter than the preset determination time T, by supplying the decoloration current pulse again, the decoloration current pulse is supplied intermittently and repeatedly. If the decoloration current pulse is supplied repeatedly in this way, the electromotive force generated in the display segment is changed. When the decoloration does not progress, the electromotive force is hardly generated, so that the voltage of the display segment returns to the decoloration current pulse supplied trigger voltage Vtr for nearly a fixed time after the end of supply of the current pulse. Therefore, this results in that the decoloration current pulse is supplied repeatedly at nearly constant intervals. Then, at a point of time when the decoloration current pulse is further supplied repeatedly and the decoloration progresses to some degree, an electromotive force generated in the display segment starts to appear on the detected voltage when the decoloration current pulse is not supplied. Thereby, a time required for the voltage of the display segment to reach the decoloration current pulse supplied trigger voltage Vtr after supply of the current pulse is gradually increased. Therefore, as shown in FIG. 16, the supply interval of the decoloration current pulse is gradually longer with the course of time. In addition, from this point of time when the decoloration progresses to some degree, upon supply of the current pulse, the electric resistance of the display segment starts to increase. In response to this, a voltage generated in the display segment upon supply of the current pulse is gradually increased.

Then, the CPU may compare the voltage value detected by the voltage detection circuit 20-4 during repetition of supply of the current pulse with the threshold voltage for counting Vc as a preset determination value, and then, the CPU counts the number of times this detected voltage values exceed the threshold voltage for counting Vc. Then, in the case where the counted number of times reaches a preset number n (in FIG. 16, in order to simplify the drawing, n is represented as n=4, but n=10 is preferable because the current pulse is easily affected by noise when the present number n is too small and the excess decoloration state is feared when the present number n is too large), by determining the end of decoloration, the CPU ends the supply operation of each decoloration current pulse as described above and end the decoloration step.

According to the present embodiment, as described above, the unillustrated CPU counts a time after end of supply of each decoloration current pulse till the voltage value detected by the voltage detection circuit 20-4 reaches the decoloration current pulse supplied trigger voltage Vtr. As shown in FIG. 16, in the case where this counted time reaches the determination T, namely, when the voltage value to be detected by the voltage detection circuit 20-4 does not reach the decoloration current pulse supplied trigger voltage Vtr even after the preset determination time T has elapsed, by determining that the decoloration is ended, the CPU ends the supply operation of the decoloration current pulse as described above.

On the other hand, in the case where the set value of the decoloration current pulse supplied trigger voltage Vtr is not an appropriate value because the property of the display segment when setting the decoloration current pulse supplied trigger voltage Vtr is varied, for example, or the case where the value of the decoloration current pulse supplied trigger voltage Vtr is set higher than the value to be essentially set because the value of the decoloration current pulse supplied trigger voltage Vtr is erroneously set, the following problem will occur as shown in FIG. 17. That is, even if supply of the decoloration current pulse is repeated, a time till the voltage value detected by the voltage detection circuit 20-4 reaches the decoloration current pulse supplied trigger voltage Vtr never exceeds the determination time T, so that it is feared that the decoloration step is never ended. Therefore, according to the seventh embodiment, further, by counting the number of times the voltage of the display segment when the decoloration current pulse is supplied which is increased in accordance with increase of the electric resistance of the display segment exceeds the threshold voltage for counting Vc, when the number of counting reaches the preset number of times n, the decoloration step is ended. Thereby, the case where the decoloration step is not ended is avoided, and it is possible to reliably end the decoloration step.

Next, an example of a method for setting the decoloration current pulse supplied trigger voltage Vtr which is the third reference value and the threshold voltage for counting Vc which is a determination value for ending the decoloration step will be described.

Figure 18:
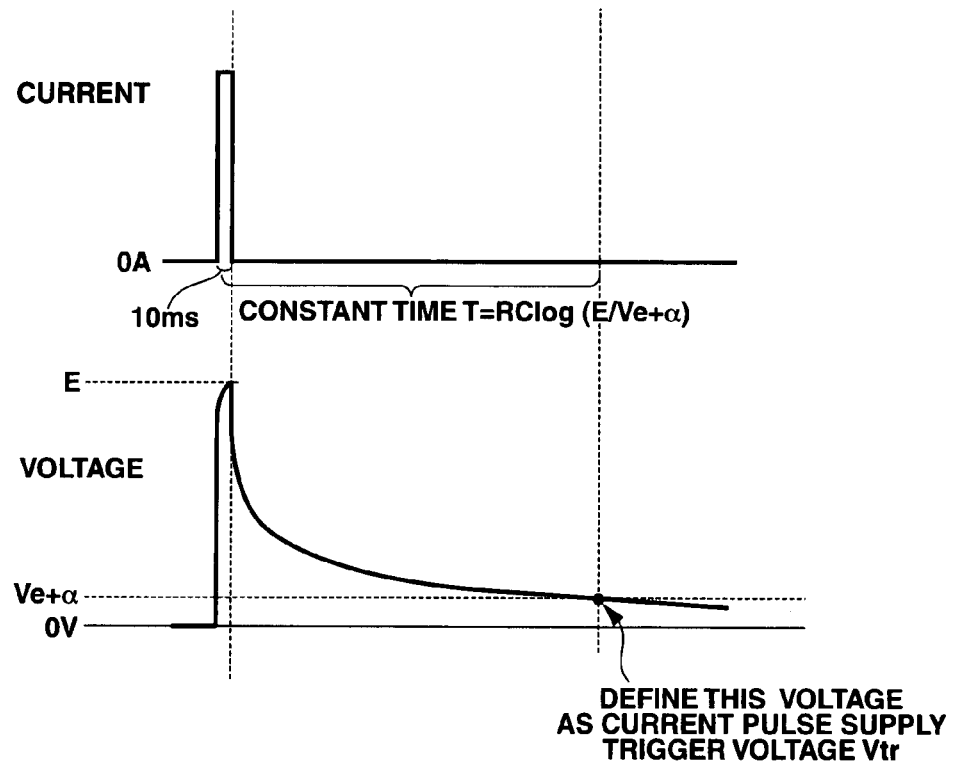
FIG. 18 is a view explaining a method for setting a decoloration current pulse supplied trigger voltage Vtr and a second threshold voltage for counting Vc according to the seventh embodiment.

FIG. 18 is a view explaining a method for setting the decoloration current pulse supplied trigger voltage Vtr and a second threshold voltage for counting Vc according to the seventh embodiment of the present invention.

At first, the determination time T will be described. When the decoloration is ended, the display segment may generate an electromotive force Ve. In addition, the display segment after supply of an erasing pulse can be considered as a model of a simple capacitor. As a result, a voltage V of the display segment after supply of the erasing pulse can be represented by the above-described formula (1) as in the fourth embodiment. Then, in the case where the ending voltage of the decoloration step is set to Ve+α, the determination time T is represented by the above-described formula (2).

Then, in the display segment with the initial property kept, the current pulse having the same current value and the same supply time as those of the decoloration current pulse is supplied once. In this case, the state where the initial property is kept ideally includes an initial state that a current has never been supplied after manufactured. However, this state may also include the display segment in the state that the initial property is almost recovered by sufficiently discharging the accumulated electric charges by grounding an electrode of the display segment for a predetermined time or more. Under such a state that the initial property is kept, the coloration step is not performed yet. Thus, when the current pulse is supplied only once as described above, the display segment is made in the excess decoloration state and an electromotive force Ve is generated in the display segment. Then, a voltage value to be detected by the voltage detection circuit 20-4 after the predetermined time T has passed (=the ending voltage of the decoloration step: Ve+α) is adopted as the above-described decoloration current pulse supplied trigger voltage Vtr as in the case of the fourth embodiment.

On the other hand, as the threshold voltage for counting Vc, a value obtained by detecting a voltage E of the display segment by means of the voltage detection circuit 20-4 just after supply of the current pulse and increasing the voltage E predetermined times, for example, a value increased 0.75 times is adopted.

These decoloration current pulse supplied trigger voltage Vtr and threshold voltage for counting Vc are saved in the inner memory of the unillustrated CPU and a memory that the CPU can access. Alternatively, by saving them in the segment profile memory 30, it may be also possible that the CPU reads them out from the segment profile memory 30 upon start of the decoloration step for use.

According to such a method, it is possible to set the decoloration current pulse supplied trigger voltage Vtr and the threshold voltage for counting Vc for each display segment. This operation is carried out for each display segment so as to set the decoloration current pulse supplied trigger voltage Vtr for each display segment.

As described above, according to the seventh embodiment, since the decoloration current to flow in the decoloration step is determined to be not continuous supply of the constant current but current pulses in plural times that a constant current for a predetermined time is outputted repeatedly, the state of the electric resistance of the display segment when supplying the constant current and the voltage for the electromotive force generated in the display segment when the constant current is not supplied can be observed, respectively. In this manner, on the basis of a time until the voltage corresponding to the electromotive force generated in the display segment reaches the decoloration current pulse supplied trigger voltage Vtr, it is determined whether the decoloration step is ended or not. Therefore, even when it takes a long time from the coloration step up to the decoloration step and a natural decoloration is caused to some degrees, it is possible to appropriately determine the end of the decoloration step.

Further, the seventh embodiment has means for determining the end of the decoloration step on the basis of the number of times the voltage of the display segment which is increased in accordance with increase of the electric resistance of the display segment when supplying the constant current exceeds the threshold voltage for counting Vc. Therefore, even when the value of the decoloration current pulse supplied trigger voltage Vtr is deviated from the appropriate value, it is possible to avoid the case where the decoloration step does not end.

Eighth Embodiment

Next, an eighth embodiment according to the present invention will be described.

Since the configuration of a display drive device according to the eighth embodiment is equal to that of the above-described seventh embodiment, the illustration and the description are herein omitted. However, according to the present embodiment, a voltage detection circuit 20-4 also detects a current flowing from the output terminal of a constant current driver 20-3 toward a positive power source +V and a voltage generated in response to a load (the resistance of the display segment, the wiring resistance or the like) which is connected to the constant current driver 20-3 when the constant current is supplied in the decoloration current pulse and then, the voltage detection circuit 20-4 inputs its voltage value in a CPU (not illustrated) via a system interface 40.

Figure 19:
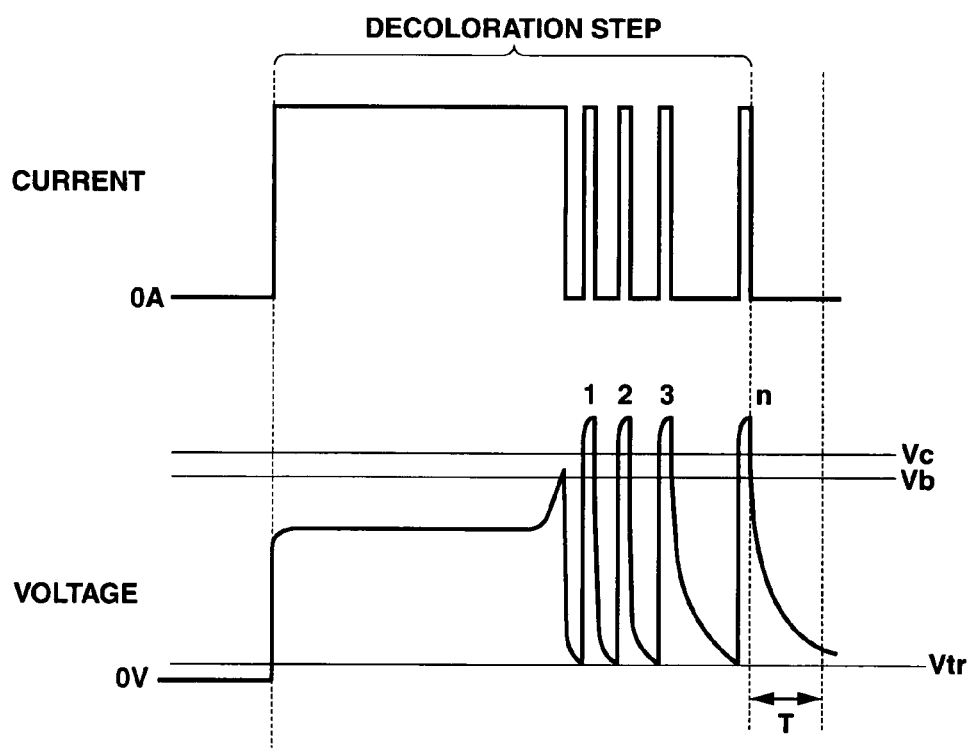
FIG. 19 is a timing chart showing a first example of a change of a current and a voltage in the decoloration step by means of a display drive device according to an eighth embodiment.

FIG. 19 is a timing chart showing a first example of a change of the current and the voltage in the decoloration step by means of the display drive device according to the eighth embodiment.

Figure 20:
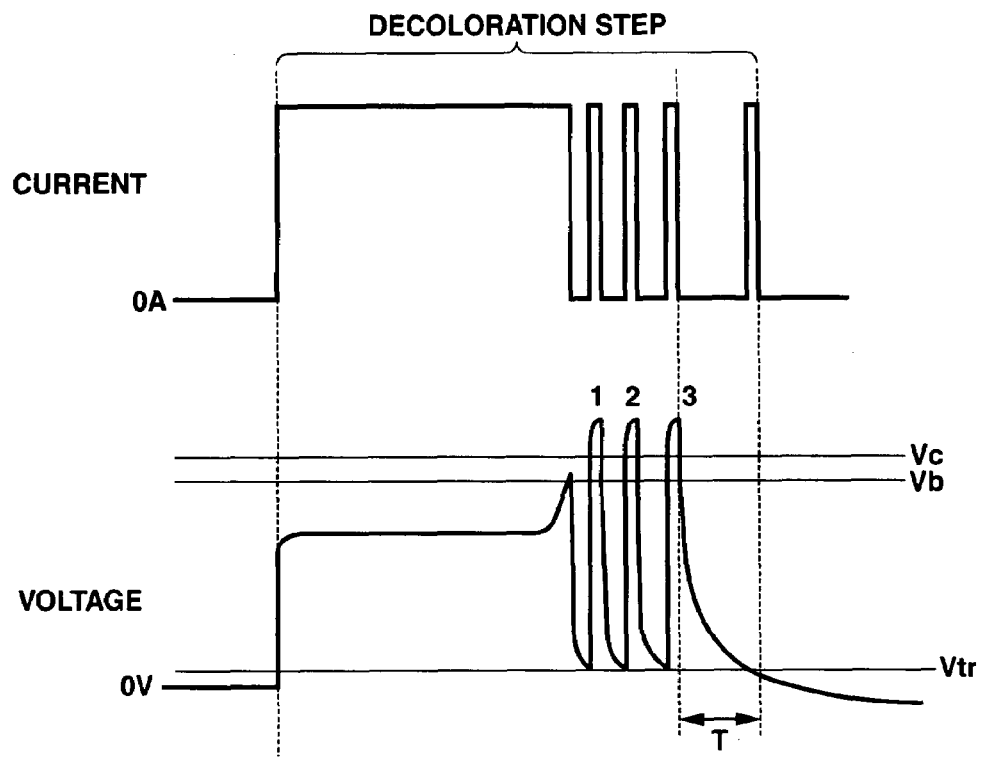
FIG. 20 is a timing chart showing a second example of a change of the current and the voltage in the decoloration step by means of the display drive device according to the eighth embodiment.

FIG. 20 is a timing chart showing a second example of a change of the current and the voltage in the decoloration step by means of the display drive device according to the eighth embodiment.

Further, since the coloration step is equal to that in the first embodiment, the illustration and the description are herein omitted.

According to the eighth embodiment, as shown in FIG. 19, in the initial step of the decoloration step, namely, on the part where the resistance value of the display segment is not largely changed, the constant current as the decoloration current pulse is continuously supplied. On the part where the resistance value of the display segment is largely changed, as in the seventh embodiment, the decoloration current pulse to output the constant current is supplied intermittently and repeatedly.

Further, as in the seventh embodiment, in the case where a time after supply of each decoloration current pulse till the voltage value detected by the voltage detection circuit 20-4 reaches the decoloration current pulse supplied trigger voltage Vtr reaches the determination time T, the decoloration ending means of the eighth embodiment ends the decoloration step. Also in the case where the number of times the voltage of the display segment when the decoloration current pulse is supplied exceeds the threshold voltage for counting Vc reaches the preset number of times n, the decoloration ending means of the eighth embodiment ends the decoloration step.

Thereby, when the amounts of the electric charges to be injected in the display segment in the decoloration step are the same, a time required for the decoloration step can be shorter than the case of the seventh embodiment.

Here, continuous supply of the constant current is changed to intermittent supply of the decoloration current pulse when the voltage value upon supply of the constant current detected by the voltage detection circuit 20-4 exceeds a threshold value Vb set in advance in accordance with change of the resistance value of the display segment. As in the threshold value Vb according to the above-described second embodiment, this threshold value Vb can be set according to the same method as the setting method described with reference to FIG. 10.

Also according to the present embodiment, as in the seventh embodiment, as shown in FIG. 20, for example, in the case where the value of the decoloration current pulse supplied trigger voltage Vtr is set higher than the value to be essentially set and the time for the voltage value detected by the voltage detection circuit 20-4 to reach the decoloration current pulse supplied trigger voltage Vtr never exceeds the determination time T even if supply of the decoloration current pulse is repeated, the decoloration ending means is provided with the constitution to end the decoloration step in the case where the number of times the voltage of the display segment which is increased in accordance with increase of the electric resistance of the display segment exceeds the threshold voltage for counting Vc reaches the preset number of times n. Therefore, it is possible to avoid the case where the decoloration step does not end.

Ninth Embodiment

Next, a ninth embodiment according to the present invention will be described.

Since the configuration of a display drive device according to the ninth embodiment is equal to that of the above-described eighth embodiment, the illustration and the description thereof are herein omitted. However, in the present embodiment, two kinds of current values i1 and i2 are further stored in the segment profile memory 30.

Figure 21:
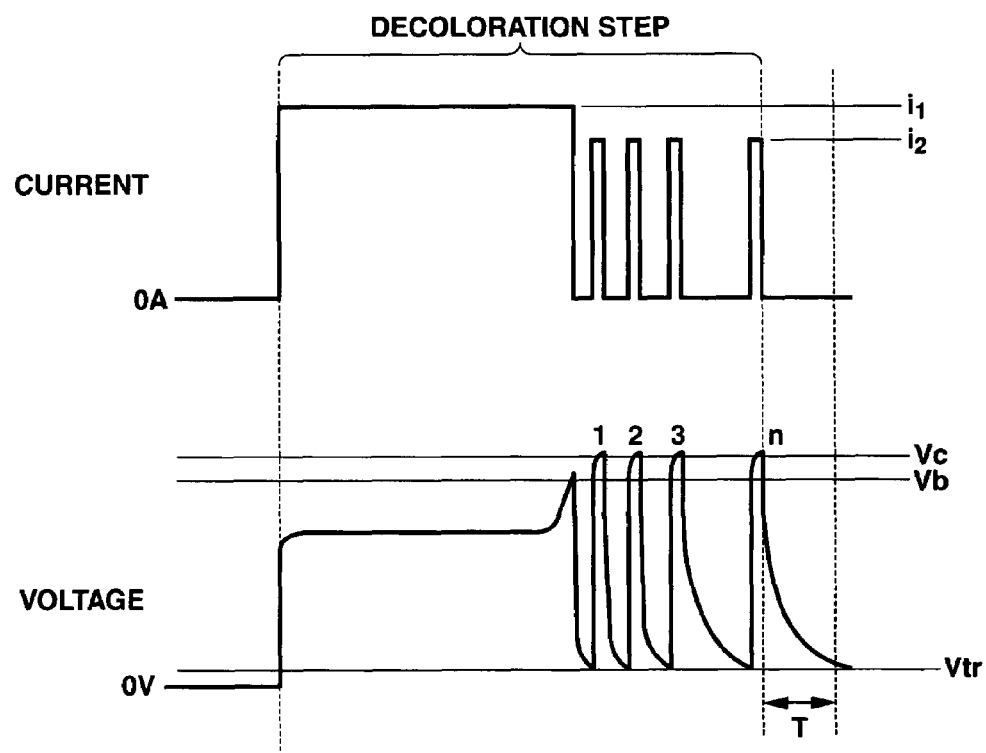
FIG. 21 is a timing chart showing a first example of a change of a current and a voltage in the decoloration step by means of a display drive device according to a ninth embodiment.

FIG. 21 is a timing chart showing a first example of a change of the current and the voltage in the decoloration step by means of the display drive device according to the ninth embodiment.

Figure 22:
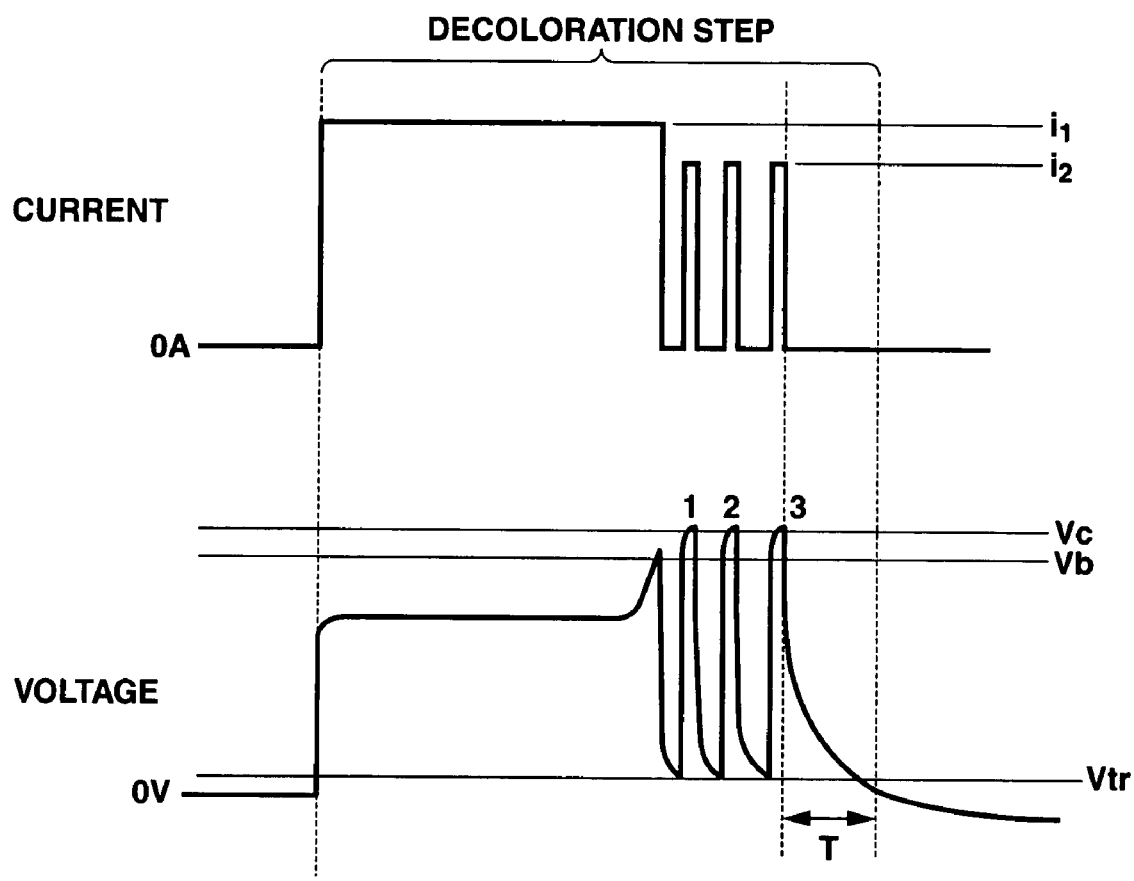
FIG. 22 is a timing chart showing a second example of a change of the current and the voltage in the decoloration step by means of the display drive device according to the ninth embodiment.

FIG. 22 is a timing chart showing a second example of a change of the current and the voltage in the decoloration step by means of the display drive device according to the ninth embodiment.

Since the coloration step is equal to the above-described first embodiment, the illustration and the description thereof are herein omitted.

According to the eighth embodiment, on the part where the resistance value of the display segment is not largely changed, the constant current is continuously supplied as a decoloration current pulse, and on the part where the resistance value of the display segment is largely changed, the decoloration current pulse is supplied intermittently and repeatedly. Then, the current values of respective constant currents are made equal.

On the contrary, according to the ninth embodiment, as shown in FIGS. 21 and 22, when intermittently and repeatedly outputting the decoloration current pulse, its current value i2 is made smaller than the current value i1, which is obtained when the constant current is continuously supplied.

Further, as in the above-described eighth embodiment, in the case where a time after supply of each decoloration current pulse till the voltage value detected by the voltage detection circuit 20-4 reaches the decoloration current pulse supplied trigger voltage Vtr reaches the determination time T, the decoloration ending means of the present embodiment ends the decoloration step. Also in the case where the number of times the voltage of the display segment when the decoloration current pulse is supplied exceeds the threshold voltage for counting Vc reaches the preset number of times n, the decoloration ending means of the ninth embodiment ends the decoloration step.

According to the ninth embodiment, the voltage is increased as the resistance value of the display segment is increased. However, on the part where the resistance value is largely changed, the current value of the constant current is decreased, so that it is possible to reliably prevent the display segment from being damaged due to increase in voltage depending on increase of the resistance value.

In the present embodiment, it is assumed that both of these current values i1 and i2 are stored in the segment profile memory 30. However, they may be stored in a storage device which is different from the segment profile memory 30.

Also according to the present embodiment, as in the seventh embodiment, as shown in FIG. 21, for example, in the case where the value of the decoloration current pulse supplied trigger voltage Vtr is set higher than the value to be essentially set and the time for the voltage value detected by the voltage detection circuit 20-4 to reach the decoloration current pulse supplied trigger voltage Vtr never exceeds the determination time T even if supply of the decoloration current pulse is repeated, the decoloration ending means is provided with the constitution to end the decoloration step in the case where the number of times the voltage of the display segment which is increased in accordance with increase of the electric resistance of the display segment exceeds the threshold voltage for counting Vc reaches the preset number of times n. Therefore, it is possible to avoid the case where the decoloration step does not end.

The present invention has been described based on the embodiments. However, it is a matter of course that the present invention is not limited to the above-described embodiments but various modifications and supplys of the present invention are available within a spirit of the present invention.

For example, in the above-described respective embodiments, a display panel in a segment system is described. However, the methods of the above-described embodiments can be also supplied to a display panel in a dot matrix system. In the case of the dot matrix system, the segment profile memory 30 is not always required since the area of each display unit is equal.

In addition, the decoloration step ending voltage Vr, the threshold value Vb, the decoloration current pulse supplied trigger voltage Vtr, and the threshold voltage for counting Vc may be made a common value for each display segment.

Further, the above-described embodiments may include various stages of inventions and due to appropriate combinations of disclosed plural constituent elements, various inventions can be extracted. For example, even if some constituent elements are deleted from all the constituent elements disclosed in the embodiments, in the case where the problems described in "Problems to be Solved by the Invention" can be solved and the advantage described in "Advantage of the Invention" can be obtained, this constitution having some constituent elements deleted can be extracted as the invention.

What is claimed is:

1. A display drive device comprising:
a display element including at least one display electrode and one counter electrode disposed opposite to the display electrode, and an electrolyte between the display electrode and the counter electrode, the display element being colored by injecting a first electric charge into the electrolyte via the display electrode due to an oxidation-deoxidization reaction and being decolored by injecting a second electric charge having an inverse polarity of the first electric charge into the electrolyte;
at least one constant current supply circuit which supplies a constant current as a decoloration current pulse having a predetermined pulse width to the display electrode upon the decoloration and injects the second electric charge having the inverse polarity into the electrolyte;
a voltage detection circuit which detects a voltage value generated in the display electrode; and
a control circuit which controls an operation of the constant current supply circuit such that the constant current is supplied to the display electrode continuously from the constant current supply circuit at first, and when the voltage value to be detected by the voltage detection circuit exceeds a preset threshold value, intermittently and repeatedly supplies the decoloration current pulse from the constant current supply circuit to the display electrode upon the decoloration, and ends the decoloration based on the voltage value to be detected by the voltage detection circuit;
wherein the threshold value is undated every time the decoloration is made a predetermined number of times, and said predetermined number of times is at least once.

2. The display drive device according to claim 1, wherein the control circuit controls the constant current supply circuit to repeatedly supply the decoloration current pulse to the display electrode at predetermined supply intervals, and to end the supply operation of the decoloration current pulse to the display electrode when the voltage value to be detected by the voltage detection circuit when the decoloration current pulse is not supplied from the constant current supply circuit to the display electrode exceeds a preset first reference value.

3. The display drive device according to claim 2, wherein the first reference value is set to a value of a voltage in response to an electromotive force generated in the display electrode when the decoloration current pulse is supplied once to the display electrode, supply of the decoloration current pulse is ended, and after a time in response to the supply interval of the decoloration current pulse has passed in a state that an initial property is kept by the display element.

4. The display drive device according to claim 2, wherein the control circuit controls the constant current supply circuit to repeat an operation of supplying the decoloration current pulse to the display electrode when the voltage value to be detected by the voltage detection circuit reaches a preset second reference value after the decoloration current pulse is supplied to the display electrode by the constant current supply circuit and before a preset determination time has passed, and to end the supply operation of the decoloration current pulse to the display electrode when the voltage value to be detected by the voltage detection circuit does not reach the preset second reference value before the first determination time has passed.

5. The display drive device according to claim 4, wherein the second reference value is set to a value of a voltage in response to an electromotive force generated in the display electrode when the decoloration current pulse is supplied once to the display electrode, supply of the decoloration current pulse is ended, and after a time in response to the supply interval of the decoloration current pulse has passed in a state that an initial property is kept by the display element.

6. The display drive device according to claim 1, wherein the control circuit controls the constant current supply circuit to repeat an operation of supplying the decoloration current pulse to the display electrode when the voltage value to be detected by the voltage detection circuit reaches a preset third reference value when the decoloration current pulse is not supplied to the display electrode by the constant current supply circuit, and to end the supply operation of the decoloration current pulse to the display electrode when the number of times the voltage value of the display electrode to be detected by the voltage detection circuit exceeds the preset determination value when supplying the decoloration current pulse to the display electrode exceeds a predetermined number of times.

7. The display drive device according to claim 6, wherein the control circuit further controls the constant current supply circuit to end the supply operation of the decoloration current pulse to the display electrode when the voltage value to be detected by the voltage detection circuit does not reach the preset third reference value after the decoloration current pulse is supplied to the display electrode by the constant current supply circuit upon decoloration until the preset determination time passes.

8. The display drive device according to claim 6, wherein the third reference value is set to a value of a voltage in response to an electromotive force generated in the display electrode when the decoloration current pulse is supplied once to the display electrode, supply of the decoloration current pulse is ended, and after the determination time has passed in a state that an initial property is kept by the display element.

9. The display drive device according to claim 6, wherein, by supplying the decoloration current pulse to the display electrode with an initial property kept by the display element, the determination value is set to a value obtained by increasing the value of the voltage of the display electrode to be detected at that time by the voltage detection circuit a predetermined number of times.

10. The display drive device according to claim 6,
wherein the control circuit controls the constant current supply circuit upon the decoloration, at first, continuously supplying the constant current to the display electrode, and when the voltage value to be detected by the voltage detection circuit exceeds a preset threshold value, supplies the decoloration current pulse intermittently and repeatedly to the display electrode, and
wherein the determination value is set to a value higher than the threshold value.

11. The display drive device according to claim 1, wherein the control circuit further comprises a current value setting circuit which sets a current value of the constant current, to be supplied to the display electrode by the decoloration current pulse, to a value in proportion to an area of the display electrode by the constant current supply circuit.

12. The display drive device according to claim 1, wherein the threshold value is set based on the voltage value generated in the display electrode during a period of time when the resistance value of the display electrode is not substantially changed in a period of time when the constant current is continuously supplied to the display electrode upon the decoloration.

13. The display drive device according to claim 1, wherein the threshold value is set to a value obtained by increasing the voltage value generated in the display electrode a predetermined number of times during a period of time when the resistance value of the display electrode is not substantially changed.

14. The display drive device according to claim 1, wherein the threshold value is set to a value obtained by adding a predetermined value to the voltage value generated in the display electrode during a period of time when the resistance value of the display electrode is not substantially changed.

15. The display drive device according to claim 1, wherein the control circuit controls a current value of the constant current to be supplied to the display electrode from the constant current supply circuit, and sets the current value of the constant current upon supply of the decoloration current pulse to a value which is smaller than the current value at the time of continuous supply of the constant current.

16. A display drive device comprising:
a display element including at least one display electrode and one counter electrode disposed opposite to the display electrode, and an electrolyte between the display electrode and the counter electrode, the display element being colored by injecting a first electric charge into the electrolyte via the display electrode due to an oxidation-deoxidization reaction and being decolored by injecting a second electric charge having an inverse polarity of the first electric charge into the electrolyte;
at least one constant current supply circuit which supplies a constant current as a decoloration current pulse having a predetermined pulse width to the display electrode upon the decoloration and injects the second electric charge having the inverse polarity into the electrolyte;
a voltage detection circuit which detects a voltage value generated in the display electrode; and
a control circuit which controls an operation of the constant current supply circuit such that the constant current is supplied to the display electrode continuously from the constant current supply circuit at first, and when the voltage value to be detected by the voltage detection circuit exceeds a predetermined threshold value, intermittently and repeatedly supplies the decoloration current pulse at predetermined supply intervals from the constant current supply circuit to the display electrode upon the decoloration, and ends the supply operation of the decoloration current pulse to the display electrode when the voltage value to be detected by the voltage detection circuit when the decoloration current pulse is not supplied from the constant current supply circuit to the display electrode exceeds a preset first reference value;
wherein the threshold value is undated every time the decoloration is made a predetermined number of times, and the predetermined number of times is at least once.

17. A display device, comprising:
a display unit including at least one display electrode and one counter electrode disposed opposite to the display electrode, and an electrolyte between the display electrode and the counter electrode, the display unit being colored by injecting a first electric charge into the electrolyte via the display electrode due to an oxidation-deoxidization reaction and being decolored by injecting a second electric charge having an inverse polarity of the first electric charge into the electrolyte;

at least one constant current supply circuit which supplies a constant current as a decoloration current pulse having a predetermined pulse width to the display electrode of the display unit upon the decoloration and injects the second electric charge having the inverse polarity into the electrolyte;

a voltage detection circuit which detects a voltage value generated in the display electrode of the display unit; and a control circuit which controls an operation of the constant current supply circuit such that the constant current is supplied to the display electrode continuously from the constant current supply circuit at first, and when the voltage value to be detected by the voltage detection circuit exceeds a preset threshold value, intermittently and repeatedly supplies the decoloration current pulse from the constant current supply circuit to the display electrode of the display unit upon the decoloration, and ends the decoloration based on the voltage value of the display electrode to be detected by the voltage detection circuit;

wherein the threshold value is undated every time the decoloration is made a predetermined number of times, and the predetermined number of times is at least once.

18. The display device according to claim 17, wherein the control circuit controls the constant current supply circuit to repeatedly supply the decoloration current pulse to the display electrode at predetermined supply intervals, and to end the supply operation of the decoloration current pulse to the display electrode when the voltage value of the display electrode to be detected by the voltage detection circuit when the decoloration current pulse is not supplied from the constant current supply circuit to the display electrode exceeds a preset first reference value.

19. The display device according to claim 18, wherein the first reference value is set to a value of a voltage in response to an electromotive force generated in the display electrode when the decoloration current pulse is supplied once to the display electrode, supply of the decoloration current pulse is ended, and after a time in response to the supply interval of the decoloration current pulse has passed in a state that an initial property is kept by the display unit.

20. The display device according to claim 18, wherein the display electrode is a display segment to form a predetermined display pattern and a plurality of display segments are aligned on the display unit, and wherein the first reference value is set for each display segment.

21. The display device according to claim 17, wherein the control circuit controls the constant current supply circuit to repeat an operation of supplying the decoloration current pulse to the display electrode when the voltage value of the display electrode to be detected by the voltage detection circuit reaches a preset second reference value after the decoloration current pulse is supplied to the display electrode by the constant current supply circuit and before a preset determination time has passed, and to end the supply operation of the decoloration current pulse to the display electrode when the voltage value of the display electrode to be detected by the voltage detection circuit does not reach the preset second reference value before the first determination time has passed.

22. The display device according to claim 21, wherein the second reference value is set to a value of a voltage in response to an electromotive force generated in the display electrode when the decoloration current pulse is supplied once to the display electrode, supply of the decoloration current pulse is ended, and after the determination has passed in a state that an initial property is kept by the display unit.

23. The display device according to claim 21, wherein the display electrode is a display segment to form a predetermined display pattern and a plurality of display segments are aligned on the display unit, and wherein the second reference value is set for each display segment.

24. The display device according to claim 17, wherein the control circuit controls the constant current supply circuit to repeat an operation of supplying the decoloration current pulse to the display electrode when the voltage value of the display electrode to be detected by the voltage detection circuit reaches a preset third reference value when the decoloration current pulse is not supplied to the display electrode by the constant current supply circuit, and to end the supply operation of the decoloration current pulse to the display electrode when the number of times the voltage value of the display electrode to be detected by the voltage detection circuit exceeds the preset determination value when supplying the decoloration current pulse to the display electrode exceeds a predetermined number of times.

25. The display device according to claim 24, wherein the control circuit further controls the constant current supply circuit to end the supply operation of the decoloration current pulse to the display electrode when the voltage value of the display electrode to be detected by the voltage detection circuit does not reach the preset third reference value after the decoloration current pulse is supplied to the display electrode by the constant current supply circuit upon the decoloration and before the preset determination time has passed.

26. The display device according to claim 24, wherein the third reference value is set to a value of a voltage in response to an electromotive force generated in the display electrode when the decoloration current pulse is supplied once to the display electrode, supply of the decoloration current pulse is ended, and after the determination time has passed in a state that an initial property is kept by the display unit.

27. The display device according to claim 24, wherein, by supplying the decoloration current pulse to the display electrode with an initial property kept by the display unit, the determination value is set to a value obtained by increasing the value of the voltage of the display electrode to be detected at that time by the voltage detection circuit a predetermined number of times.

28. The display device according to claim 24, wherein the control circuit controls the constant current supply circuit upon the decoloration, at first, continuously supplying the constant current to the display electrode of the display unit, and when the voltage value to be detected by the voltage detection circuit exceeds a preset threshold value, supplies the decoloration current pulse intermittently and repeatedly to the display electrode, and wherein the determination value is set to a value higher than the threshold value.

29. The display device according to claim 24, wherein the display electrode is a display segment to form a predetermined display pattern and a plurality of display segments are aligned on the display unit, and wherein the third reference value and the determination value are set for each display segment.

30. The display device according to claim 17,
wherein the display electrode is a display segment to form a predetermined display pattern and a plurality of display segments are aligned on the display unit, and
wherein the control circuit further comprises a current value setting circuit which sets a current value of the constant current, to be supplied from the constant current supply circuit to the display electrode upon the decoloration, to a value in proportion to an area of each display segment.

31. The display device according to claim 17,
wherein the display electrode is a display segment to form a predetermined display pattern and a plurality of display segments are aligned on the display unit, and
wherein the threshold value is set for each display segment.

32. The display device according to claim 17, wherein the threshold value is set based on the voltage value generated in the display electrode during a period of time when the resistance value of the display electrode is not substantially changed in a period of time when the constant current is continuously supplied to the display electrode upon the decoloration.

33. The display device according to claim 32, wherein the threshold value is set to a value obtained by increasing the voltage value generated in the display electrode a predetermined number of times during a period of time when the resistance value of the display electrode is not substantially changed.

34. The display device according to claim 32, wherein the threshold value is set to a value obtained by adding a predetermined value to the voltage value generated in the display electrode during a period of time when the resistance value of the display electrode is not substantially changed.

35. The display device according to claim 17, wherein the control circuit controls a current value of the constant current to be supplied to the display electrode from the constant current supply circuit, and sets the current value of the constant current upon supply of the decoloration current pulse to a value which is smaller than the current value at the time of continuous supply of the constant current.

* * * * *